(12) United States Patent
Veljanoski et al.

(10) Patent No.: US 11,036,483 B2
(45) Date of Patent: Jun. 15, 2021

(54) METHOD FOR PREDICTING THE SUCCESSFULNESS OF THE EXECUTION OF A DEVOPS RELEASE PIPELINE

(71) Applicant: XebiaLabs, Inc., Burlington, MA (US)

(72) Inventors: Jovan Veljanoski, Utrecht (NL); Bulat Yaminov, Utrecht (NL)

(73) Assignee: Digital.ai Software, Inc., Burlington, MA (US)

( * ) Notice: Subject to any disclaimer, the term of this patent is extended or adjusted under 35 U.S.C. 154(b) by 20 days.

(21) Appl. No.: 16/709,846

(22) Filed: Dec. 10, 2019

(65) Prior Publication Data
US 2020/0310769 A1     Oct. 1, 2020

Related U.S. Application Data

(60) Provisional application No. 62/824,208, filed on Mar. 26, 2019.

(51) Int. Cl.
*G06F 8/60* (2018.01)
*G06F 17/18* (2006.01)
(Continued)

(52) U.S. Cl.
CPC .............. *G06F 8/60* (2013.01); *G06F 8/70* (2013.01); *G06F 17/18* (2013.01); *G06N 20/00* (2019.01)

(58) Field of Classification Search
None
See application file for complete search history.

(56) References Cited

U.S. PATENT DOCUMENTS 8,639,553 B1 * 1/2014 Knauth ............ G06Q 10/06312
                                                    705/7.22
10,565,093 B1 * 2/2020 Herrin ...................... G06F 8/60
(Continued)

OTHER PUBLICATIONS

Chirici et al., "A meta-analysis and review of the literature on the k-Nearest Neighbors technique for forestry applications that use remotely sensed data," Feb. 2, 2016, Elsevier Inc., p. 283-294. (Year: 2016).*

(Continued)

*Primary Examiner* — Qing Chen
(74) *Attorney, Agent, or Firm* — Rahman LLC

(57) ABSTRACT

The release/delivery of software applications in a corporate setting is often a complex process chaining dozens of steps handled by a myriad of so-called DevOps tools. This process is known as a release or delivery pipeline. Embodiments of the invention provide a method and system of predicting the risk, status, and duration associated with the execution of such a release/delivery pipeline. Embodiments also provide an engine that predicts the probability of failure, as well as the status and duration of each individual pipeline step. One embodiment begins by obtaining all necessary data from a release orchestration tool, which contains the information of the structure, content, and any other custom specifications of a release/delivery pipeline. The data is transformed and encoded. The predictions are then calculated by comparing this data to a historic record of already executed release/delivery pipelines which were archived by the release orchestration tool. Finally, the predictions obtained are presented in a user interface to the user of the release orchestration tool.

15 Claims, 15 Drawing Sheets

(51) Int. Cl.
  *G06N 20/00* (2019.01)
  *G06F 8/70* (2018.01)

(56) References Cited

U.S. PATENT DOCUMENTS

| | | | |
|---|---|---|---|
| 2017/0003948 A1 | | 1/2017 | Iyer et al. |
| 2017/0091306 A1* | | 3/2017 | Manjunath .............. G06F 17/16 |
| 2018/0032322 A1* | | 2/2018 | Jagannath ................. G06F 8/60 |
| 2018/0068271 A1 | | 3/2018 | Abebe et al. |
| 2018/0150783 A1 | | 5/2018 | Xu et al. |
| 2018/0173525 A1* | | 6/2018 | Suparna .............. G06F 11/3688 |
| 2019/0129701 A1* | | 5/2019 | Hawrylo .................... G06F 8/65 |
| 2019/0129712 A1* | | 5/2019 | Hawrylo .................... G06F 8/71 |
| 2020/0218622 A1* | | 7/2020 | Zhang .................... G06N 5/046 |

OTHER PUBLICATIONS

Moody, J., "Fast learning in multi-resolution hierarchies", Yale Computer Science, 11 pages (1989).
Weinberger, L., et al., "Feature Hashing for Large Scale Multitask Learning," in Proc. 26th Int'l Conf. Machine Learning, 8 pages (2009).
Pedregosa F., et al., "Scikit-learn: Machine Learning in Python," J. Machine Learning Res., 12:2825-2830 (2011).
Broder, A.Z., et al., "Min-wise independent permutations," Harvard Univ. Computer Science Dept., 30 pages (1998).
Omohundro, S.M., "Five Balltree Construction Algorithms," Int'l Computer Science Institute, 22 pages (1989).
Brochu, E., et al., "A Tutorial on Bayesian Optimization of Expensive Cost Functions, with Application to Active User Modeling and Hierarchical Reinforcement Learning," arXiv:1012.2599v1 [cs.LG] Dec. 12, 2010, 49 pages.
Snoek, J., et al., "Practical Bayesian Optimization of Machine Learning Algorithms," School of Engineering & Applied Sciences, 9 pages (2012).
Notification of Transmittal of the International Search Report and the Written Opinion of the International Searching Authority, or the Declaration, "Method for Predicting the Successfulness of the Execution of a DevOps Release Pipeline," PCT/US2020/015591, dated May 27, 2020.

\* cited by examiner

Plugins / Plugins 21.0.0

Show [Properties ▼]

Properties for Plugins 21.0.0

| | | |
|---|---|---|
| Release name* | [Plugins 21.0.0] | — 201 |
| Use risk profile ⓘ | [Default risk profile ▼] | — 203 / 202 |
| Description | [Set description] | |
| Created from template | Plugins Release | |
| Risk profile | Default risk profile | — 204 |
| Release Variables ○ | | |

Release variables can be set on the Variables Screen

[Save] [Reset]

Release details

| | | | |
|---|---|---|---|
| Flag status | [Set status text...] | | |
| Start date | [3/26/19  10:52 AM  Amsterdam] | — 205 | |
| | ☐ Start automatically on selected date | — 206 | |
| Due date | 3/26/19  10:56 AM | | |
| Duration | 0d 0h 4m | | |
| Release Owner | [XL Release Administrator] | | |
| Run automated tasks as user | [XL Release Administrator] | | |
| Password | [Click here to modify the password] | | |
| Abort on failure | ☐ | | |
| Tags | [◆ plugins ×  Add a tag...] | — 207 | |
| Attachments | [Choose File] | | |
| Share calendar | ☐ Publish link | | |

| Run unit-tests
Run Plugins 21.0..0 / Build | ~311a | 311b | Jenkins: Build |

Input properties 311c 411 [Completed]

| Server* | Jenkins NG |
| | Jenkins server to connect to |
| Username | |
| | Overrides the username used to connect to the server |
| Password | **** |
| | Overrides the password used to connect to the server |
| Job Name* | Run unit-tests |
| | Name of the job to trigger, this job must be configured on the Jenkins server. If the job is located in one or more Jenkins folders, add a 'job' segment between each folder. |
| Job Parameters | RELEASE_SCOPE=
RELEASE_STAGE=
RELEASE_EXPLICIT=8.6.0
RELEASE_CREATE_BRANCH=True |
| | If the Jenkins job expects parameters, provide them here, one parameters per line (for example, paramName=paramValue) |
| Job Env Var Name | |
| | Build environment variable name to extract |

311d

Start date
27 August 2019
Thursday
3:37 PM

☐ Check environment availability ⓘ

End date
27 August 2019
Thursday
3:37 PM

412
Duration
0d 0h 0m

Assigned to
Watchers ⓘ
Tags

Output properties
The output of the script can be stored in release variables; specify the variables to be used (optional)

| Build Number | 232 |
| | Build number of the triggered job |
| Build Status | SUCCESS |
| | Build status of the triggered job |
| Job Env Var Value | |
| | Build environment variable value |

| 601 Raw data | 602 Extract features | Extract data |
|---|---|---|
| ```json
{
  "id" : "F1/R1",
  "type" : "xlrelease.Release",
  "title" : "Plugins 17.0.0",
  "originTemplateId" : "F1/E1",
  "createdFromTrigger" : false,
  "autostart" : false,
  "owner" : "admin",
  "startDate" : "2019-01-03T14:44:02.5742",
  "endDate" : "2019-01-03T14:44:16.6792",
  "overdueNotified" : false,
  "status" : "COMPLETED",
  "tags" : [
    "plugins"
  ],
  "phases" : [
  {
    "type" : "xlrelease.Phase",
    "title" : "Build",
    "overdueNotified" : false,
    "status" : "COMPLETED",
    "tasks" : [
    {
      "type" : "xlrelease.CustomScriptTask",
      "title" : "Build artifacts",
      "overdueNotified" : false,
      "status" : "COMPLETED",
      "failureCount" : 0,
      "pythonScript" : {
        "type" : "webhook.XmlWebhook",
        "customScriptTask" : "F1/R1/P1/T11",
        "URL" : "http://localhost:5516/server/info",
        "method" : "GET",
        "result" : 8.5.1,
        "xPathExpression" : "/server-info/version"
      }
    }
    {
      "type" : "xlrelease.CustomScriptTask",
      "title" : "Check code quality",
      "overdueNotified" : false,
      "status" : "Skipped",
      "precondition" : "False",
      "failureCount" : 0,
      "pythonScript" : {
        "type" : "sonar.checkCompliance",
        "customScriptTask" : "F1/R1/P1/T11",
      }
    }
    (...! nore phase with 2 nore tasks...)
  "variables" : [
  {
    "type" : "xlrelease.StringVariable",
    "key" : "version",
    "showOnReleaseStart" : "true",
    "label" : "Version",
    "value" : "17.0.0"
  }
  {
    "type" : "xlrelease.StringVariable",
    "key" : "xlrversion",
    "showOnReleaseStart" : "false",
    "value" : "8.5.1"
  }
}
``` JASON | | Extracted features 603<br><br>release_id<br>auto_start<br>created_from_trigger<br>description<br>folder_id<br>in_vars_pairs<br>n_gate_conditions<br>n_gate_dependencies<br>n_gates_with_dependencies<br>n_input_variables<br>n_manual<br>n_manual_gates<br>n_phases<br>n_subtasks<br>n_tags<br>n_tasks_group<br>n_tasks<br>n_type_sonar.checkCompliance<br>n_type_webhook.XmlWebhook<br>n_type_xlrelease.GroovyScriptTask<br>n_type_xlrelease.ScriptTask<br>start_data_feature<br>template_id<br>title<br><br>Target features 604<br><br>status<br>failures_count<br>overdue_notified_tasks<br>overdue_notified_release<br>duration |

Plugins / Plugins 21.0.0

Show [Risk Forecast ▼]

| Name | Status | Planned Duration | Predicted Durat... | Predicted Risk — 910 | Assigned To | Task Type |
|---|---|---|---|---|---|---|
| 🔍 Filter by title... | | | | | | |
| ▶ Plugins 21.0.0 | Planned | 0d 0h 4m | . | ◉ May have failures or delays (60%) | 👤 XL Release Administrat... | Release |
| ▶ Build | Planned | 0d 0h 3m | . | . | | Phase |
| ⟨/⟩ Build artifacts | Planned | 0d 0h 1m | 0d 0h 0m | No risk | | Webhook: Xml Webhook |
| ☐ Check code quality | Planned | 0d 0h 1m | . | ◉ May be skipped or aborted (100%) | | Sonar: Check Complian... |
| ⊘ Run unit-tests | Planned | 0d 0h 1m | 0d 0h 0m | No risk | | Jenkins: Build |
| ▶ UAT | Planned | 0d 0h 2m | . | . | | Phase |
| ⟨/⟩ Deploy Plugins to UAT | Planned | 0d 0h 1m | 0d 0h 0m | ◉ May fail or miss the deadline (49%) | | Script: Jython Script |
| ⟨/⟩ Run integration tests | Planned | 0d 0h 1m | 0d 0h 0m | No risk | | Script: Groovy Script / R... |
| ▶ Verification and Approval | Planned | 0d 1h 0m | . | . | | Phase |
| ☑ Verify all builds are green | Planned | 0d 1h 0m | 0d 0h 0m | ◉ May fail or miss the deadline (47%) | | Gate |

Deploy Plugins to UAT

Statistics of 13 similar releases

| Median duration | With failures | Median failures |
|---|---|---|
| 0d 0h 0m | 6 / 13 | 0 |

| Completed (9) | Skipped (0) | Aborted (4) |

Similar tasks

| Release | Task | Started | Duration | Status | Failure | Relevance |
|---|---|---|---|---|---|---|
| Plugins 5.0.0 | ☐ Deploy Plugins to UAT | 2 months ago | 0d 0h 0m | Completed | 0 | Medium |
| Plugins 16.0.0 | ☐ Deploy Plugins to UAT | 2 months ago | 0d 0h 0m | Aborted | 1 | Medium |
| Plugins 20.0.0 | ☐ Deploy Plugins to UAT | 2 months ago | 0d 0h 0m | Aborted | 1 | Medium |
| Plugins 1.0.0 | ☐ Deploy Plugins to UAT | 2 months ago | 0d 0h 0m | Completed | 0 | Medium |
| Plugins 15.0.0 | ☐ Deploy Plugins to UAT | 2 months ago | 0d 0h 0m | Completed | 0 | Medium |
| Plugins 2.0.0 | ☐ Deploy Plugins to UAT | 2 months ago | 0d 0h 0m | Completed | 1 | Medium |
| Plugins 13.0.0 | ☐ Deploy Plugins to UAT | 2 months ago | 0d 0h 1m | Completed | 0 | Medium |
| Plugins 12.0.0 | ☐ Deploy Plugins to UAT | 2 months ago | 0d 0h 0m | Aborted | 1 | Medium |
| Plugins 11.0.0 | ☐ Deploy Plugins to UAT | 2 months ago | 0d 0h 0m | Completed | 0 | Low |

METHOD FOR PREDICTING THE SUCCESSFULNESS OF THE EXECUTION OF A DEVOPS RELEASE PIPELINE

RELATED APPLICATION(S)

This application claims the benefit of U.S. Provisional Application No. 62/824,208, filed on Mar. 26, 2019. The entire teachings of the above application(s) are incorporated herein by reference.

BACKGROUND

The Internet has fundamentally transformed the modern-day way of life. It has revolutionized the way people communicate with one another, express themselves, and search for and exchange information and services. More importantly, the Internet has greatly affected the way most companies conduct their business and interact with consumers. In fact, companies operating in virtually every industry are quickly becoming software companies.

The increasing role of software and its development puts additional pressure on companies to deliver high-quality software applications to their customers quickly, in order to stay competitive in their respective markets. However, before a software application can return value to the company, it has to go through a number of steps. The process starts at the planning phase, followed by development and building stages, then multiple testing, quality assurance, and acceptance phases, before the application is finally deployed to production. Only once in production, can customers use the application and provide feedback. Given that the quality of software products and the speed with which they are delivered are of paramount importance to the success of a company, it is only natural to ask the question: What is the set of best practices that enable organizations to reliably deliver their software with optimal speed, quality, and security? This question becomes increasingly important for large organizations such as enterprises that aim to deliver hundreds of applications that are created, managed, and operated by multiple teams.

DevOps is a set of cultural philosophies, processes, and practices that greatly eliminate waste and optimize the software production process. The goal of a DevOps strategy is to create synergy between development and operations teams, and to make them work together rather than in isolated silos. It not only enables faster delivery of software products, but also enables an effective feedback loop between the business and its customers. The benefits of a DevOps strategy have been verified by high-performing organizations for years.

Continuous Delivery (CD) is a core component of a DevOps strategy. It is an approach that focuses on producing software features and releasing them to users in short cycles. In this way, any problems that are introduced can be found and addressed promptly. An essential concept of CD is the introduction of automated testing to the development cycle. The testing is quite rigorous: it involves moving applications through a series of release activities and a progression of different test environments. This series of combined release activities such as development, testing, and deployment all the way to monitoring of the software applications in production is known as the software delivery pipeline, the Continuous Delivery pipeline, or the release pipeline. Test environments are increasingly more similar to the production environment. Automatically promoting software changes through a delivery pipeline and flagging failures as they happen are vital aspects of DevOps and CD. Automation significantly reduces the overhead of releasing applications. By constantly running tests and only promoting validated software products to the next stage of the process, CD minimizes the risk associated with the deployment of applications to live production environments. By extension, embracing a DevOps strategy also means that software applications are constantly in a state where any changes can be immediately and reliably released/delivered to consumers.

Executing all steps needed to release/deliver an application requires the use of a multitude of specialized tools. These tools help teams with each stage of the process of creating a software application, starting from the ideation phase (e.g. planning, issue tracking, monitoring progress), code development (e.g. version control, quality control, integrated development environments (IDE), build tools, artifact management), testing (e.g. unit, integration, end-to-end), deployment (e.g. deployment tools), and finally operation (e.g. monitoring, log aggregation). In fact, there are over 500 such tools, and their number is constantly increasing.

Effective DevOps teams carefully build a toolchain of products to carry out all necessary steps when releasing their application, often providing specialized automation for each individual step. However, teams find it extremely difficult to synchronize and manage the processes handled by the myriad of tools that are being used. This is an especially big problem for organizations that develop many applications, a number that can go well into the hundreds for large enterprises, where each application may require its own DevOps toolchain.

SUMMARY

Embodiments of the present invention address and solve the forgoing problem. In particular, in one embodiment, Applicants present an improved application release orchestration tool. One embodiment is referred to herein as a version of XL Release® by Applicant-Assignee. Embodiments of the improved application release orchestration tool meet the unique needs of companies that are embracing the DevOps philosophy. Embodiments such as XL Release® (improved version) orchestrate build, test, provisioning, configuration management, and deployment tools, creating a software delivery pipeline to automate the entire release/delivery process, starting from the initial idea, all the way to production. In addition, embodiments, such as XL Release® improved version, orchestrate and automate the many interdependent steps involved in deploying applications to various environments in the pipeline, and embodiments automatically advance applications across these environments, from development, through testing and staging, and finally to production. As a foundation unifying all the tools in a CD pipeline, XL Release® (improved version) disclosed herein and other embodiments of the present invention ensure that the right steps happen at the right time, with the correct settings triggering the required DevOps activities. With this approach, software releases/deliveries are always organized, integrated, and streamlined.

Successful application releases are a vital component of modern businesses. A failed deployment or a deployment of an application that was not thoroughly tested may prove extremely costly to companies and may stop operations altogether. Software release pipelines typically contain between tens and hundreds of individual steps, which makes them inherently risky due to both human error and external factors. Their heterogeneous nature means that it is extremely hard to pinpoint which step in the pipeline might be problematic. In addition, the release process is a rather lengthy one, typically spanning several hours, days, or weeks at a time. An unsuccessful, incomplete, or faulty release process typically requires a rollback of the application to the state it was in before release execution, which is not a straightforward task and subjects the company to additional losses. Therefore, having a method that would help alleviate the potential dangers associated with the release/delivery of software applications would be extremely beneficial, especially in the case of larger organizations developing numerous applications, the release/delivery of which is difficult to manage or synchronize.

The present invention alleviates the risk associated with executing a complex and arbitrary DevOps pipeline, which is meant to release/deliver dozens or even hundreds of software applications created by multiple development teams. Embodiments of the present invention can predict the probability of whether the execution of such a pipeline will complete successfully, or whether it will be aborted during some intermediate step. In addition, embodiments of the invention can predict the risk associated with the execution of such a pipeline that considers the possibility of step failures or delays. Moreover, the present invention can predict the probability of a step being skipped, aborted, or completed successfully, the probability that a step will experience at least one failure, and the expected duration of the step. The invention can be used to provide predictions about the outcome of the release/delivery process, both prior to the pipeline being executed and while the execution is ongoing.

In one embodiment, the invention is packaged in an executable container that is connected to the archiving database of a release orchestration tool such as versions of XL Release® created and owned by the Applicants (Xebia Labs of Burlington Mass.). In this case, however, the improved version of the XL Release® embodiment is configured to serve as an aggregator for all data necessary for the predictions provided by the invention. The method for providing the DevOps pipeline predictions works as follows. The data containing the information of the structure and outcome of prior pipeline executions is queried from the archiving database by the machinery that resides in the executable container. The retrieved data is then reformatted from its partially structured form to a dense tabular format. The table columns that contain textual information are encoded into numerical form via appropriate hashing functions. Furthermore, all columns are scaled in such a way that the range of their numerical values directly reflects their importance toward the predictions being made. The data is then aggregated into a k-Nearest-Neighbor algorithm.

To obtain a prediction, the XL Release® embodiment aggregator sends structural information about an upcoming or active execution to the executable container. The machinery then reformats the data in the same way as for the data queried from the archiving database and makes a comparison to all the data aggregated into the k-Nearest-Neighbor algorithm. From the results of the comparison, the machinery provides a response containing information about the most similar past executions and their outcomes. The machinery sends the output to the XL Release® embodiment aggregator that prepares and displays the information in a user interface. A weighted median of the similarities of the data queried from the k-Nearest-Neighbor algorithm is used to provide predictions related to the execution in question.

Examples of the features used to train the model that predicts the pipeline execution outcome as a whole include: the execution title and description, the number of steps in total, the number of each step type, the identifier of the pipeline template from which execution started, information about where the pipeline resides in the organizational hierarchy, the method used to start execution, and the names and values of input parameters related to execution. Similarly, the features used to predict the outcome of each individual pipeline step include: the title and description of the step, flags indicating whether the step is manual or automatic, whether the step has preconditions or dependencies, the names and values of the parameters specific to each individual step, and global information about the pipeline that the step is a part of.

While the preferred embodiment of the invention is centered around XL Release® (e.g., improved version), it is by no means limited to versions of XL Release®, and it can be easily adapted to work with any release orchestration tool.

The predictions can be applied to optimize the pipeline execution process. Because predictions are based on historical data, they can provide strong insights into potentially problematic executions or steps in an organization. An execution that is predicted to be risky is likely to encounter problems: it may be delayed, it may be aborted, or some steps may need to be repeated several times before they are successfully completed. By viewing similar executions and steps from prior processes, a release manager can get a much better overview of why any potential or recurring issues happen.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

For a more complete understanding of the invention, reference is made to the following description and accompanying drawings, in which:

FIG. 2 is a screen view of the properties of the sample release/delivery pipeline shown in FIG. 1. The shaded areas 201-207 show part of the data from which input features are created for the machine learning model;

FIG. 3 is a screen view of the properties of a common step of a typical application release/delivery pipeline, as displayed by an embodiment. The shaded areas 311a-d show part of the data from which input features are created for the machine learning model. The shaded areas 411 and 412 show the data from which the target variables are constructed;

FIG. 9 is the Forecast page in the UI of an embodiment, displaying the predictions related to an upcoming pipeline execution obtained via the present invention. Prediction results are shown for both the entire release/delivery pipeline and for each individual step of FIGS. 6 and 8, respectively;

FIG. 11 is a detailed view of the predictions provided by the present invention, related to a particular step in a release/delivery pipeline, as displayed in the UI of embodiments. This screen view is shown when one clicks on a prediction result for a particular pipeline step on the Forecast page in embodiments as shown in FIG. 9.

DETAILED DESCRIPTION

Figure 1:
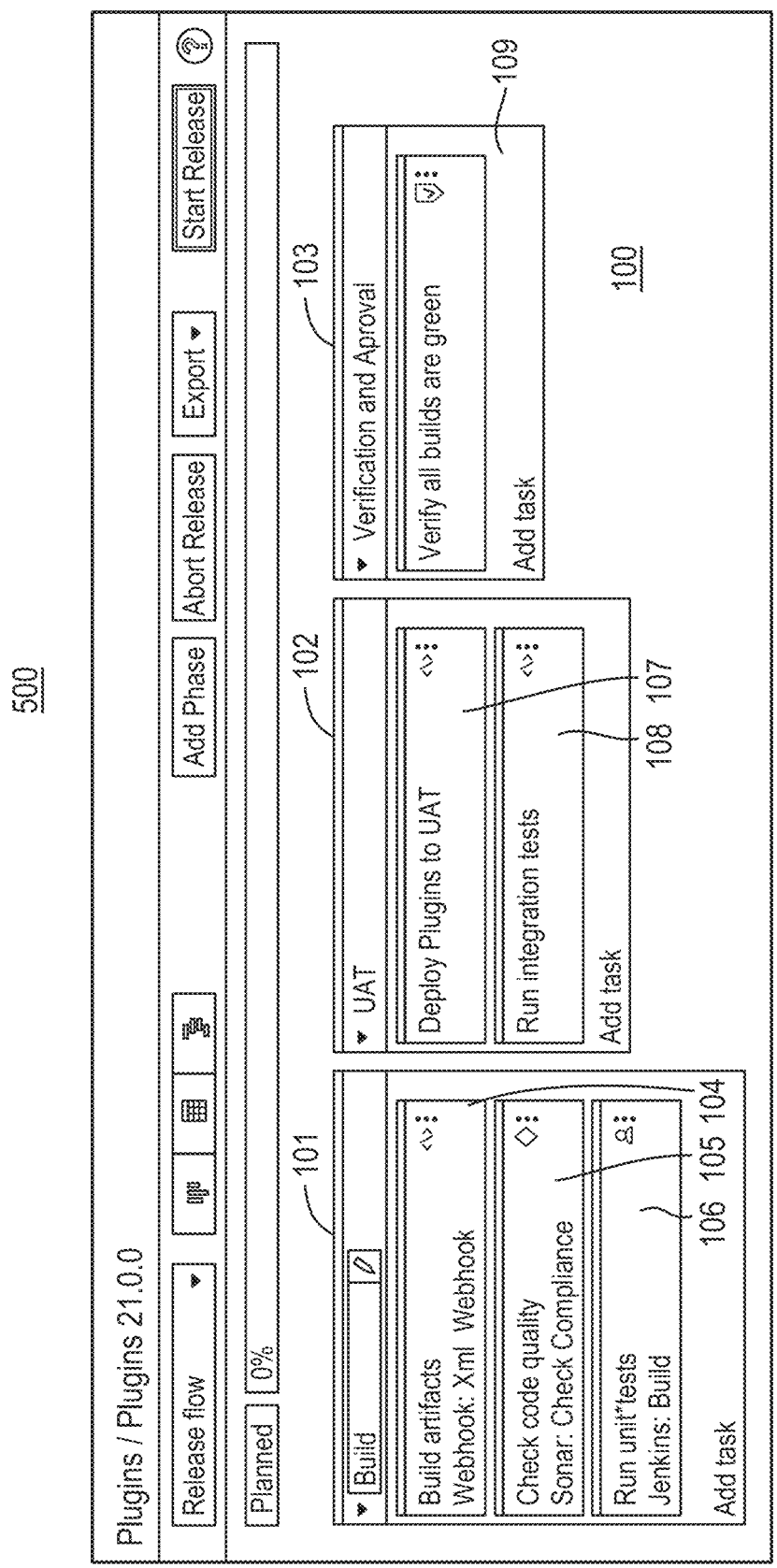
FIG. 1 is an overview of a sample release/delivery pipeline as displayed in the user interface (UI) of an embodiment. The illustrated pipeline consists of three phases, the first of which contains three tasks, the second contains two tasks, and the final phase contains a single task.

A description of example embodiments of the invention follows.

The timely delivery of high-quality software products is one of the key components that makes a company successful. The release/delivery of software becomes an increasingly challenging task, especially for larger organizations in which a single software application may be developed and maintained by multiple teams. Software development teams use a myriad of tools for planning, versioning, testing, and finally deploying an application to production to be used by customers, all chained together into what is called a DevOps release or delivery pipeline. For a software application to be released/delivered, it must go through each step in such a release/delivery pipeline, a process that is inherently risky given the large number of heterogeneous steps required to accomplish all the necessary tasks. In addition, the execution of the pipeline is often a lengthy process that can span from several hours to several days. Therefore, an intelligent system that provides warnings of any potential problems or delays with any step associated with a release pipeline, or with the overall delivery process itself, prior to execution is an incredibly valuable asset for any organization.

Embodiments of the present invention comprise two or more machine learning models that can be directly used to predict the outcome of the release/delivery process of an application release/delivery pipeline. In one embodiment, the first model predicts the probability that the execution of a release/delivery pipeline will be aborted and the probability of the release/delivery being risky. It also provides an estimate of the duration of the release/delivery process itself. The second model goes a level deeper by providing predictions for each individual step of the release/delivery pipeline: the probability of a step being skipped or aborted, the probability of a step experiencing at least one failure or a delay, and an estimate of the duration of each step.

What follows is a detailed description of the preferred embodiment of the present invention. In the preferred embodiment, a set of data-driven machine learning solutions is attached to the XL Release® release orchestration tool (forming the improved version of XL Release®), and serves as means to predict the likely outcome of the execution of a DevOps release pipeline. It is understood that other embodiments may likewise be formed of a set of data-driven machine learning prediction modules coupled to one or more of various release orchestration tools. The following paragraphs will give a comprehensive description of the nature of the data and the data querying process, the anatomy of the algorithms including the data preprocessing steps, the training and predicting (i.e. operating) modes of the algorithms, as well as the overall architecture of embodiments of the invention.

Generally speaking, an application release/delivery orchestration instrument, such as XL Release®, can be used to automate, synchronize, and link over 400 DevOps tools that are commonly used when releasing applications across various industries. In XL Release®, each release pipeline is represented by an entity simply called a release. Each release entity is composed of numerous steps (e.g. build, test, approval) called tasks, which form the application release/delivery pipeline. These steps can be quite varied in nature, and are done by the many DevOps tools to which XL Release® connects. The tasks can be organized in a number of phases, which gives a logical structure to the release/delivery pipeline. In addition, a release entity also contains all the necessary instructions, parameters, and conditions required to release/deliver an application.

Figure 4:
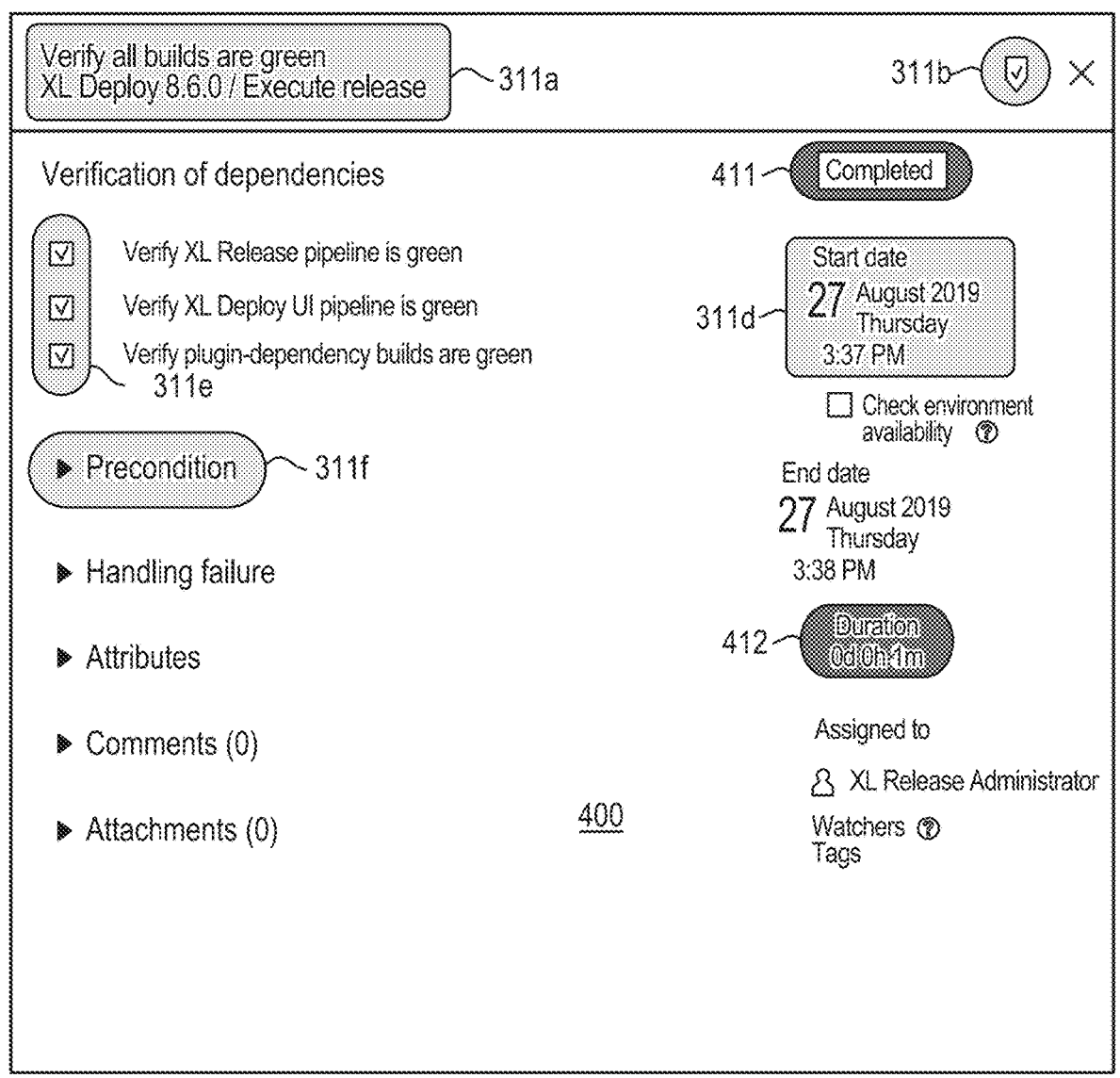
FIG. 4 is a screen view of the properties of a common manual step of a typical application release/delivery pipeline, as displayed by an embodiment. The shaded areas 311a, 311b, 311d, 311e, and 311f show part of the data from which input features are created for the machine learning model. The shaded areas 411 and 412 show the data from which the target variables are constructed.

FIG. 1 depicts how a release/delivery pipeline is displayed in the user interface 100 of XL Release® or equivalent release orchestration tool 500 in embodiments of the present invention. In this example, the release is composed of three phases (101, 102 and 103), the first of which contains three tasks (104, 105, and 106), the second two tasks (107 and 108), and the third single task (109). The progression of the steps when the release/delivery pipeline is being executed is shown top to bottom for each phase 101, 102, and 103 while the phases progress left to right in the displayed screen view. FIG. 2 shows the properties screen view 200 for the example release/delivery pipeline of FIG. 1 as displayed in the UI of embodiments of the present invention. The shaded regions 201, 202, 203, 204, 205, 206, 207 highlight some of the fields that contain data used to train the machine learning models. As additional examples, FIG. 3. and FIG. 4. show the UI detail screen views 300, 400 of two tasks 104, 105 in an embodiment. The shaded regions 311a, b, c, d, e, f (generally 311) mark some of the fields or properties 312 of the tasks 104, 105 that are used to train the models. Because these two steps (tasks 104, 105) belong to release/delivery pipelines that have already been executed and archived, the shaded regions 411 and 412 mark some of the target features the pipeline step model is predicting.

Figure 5:
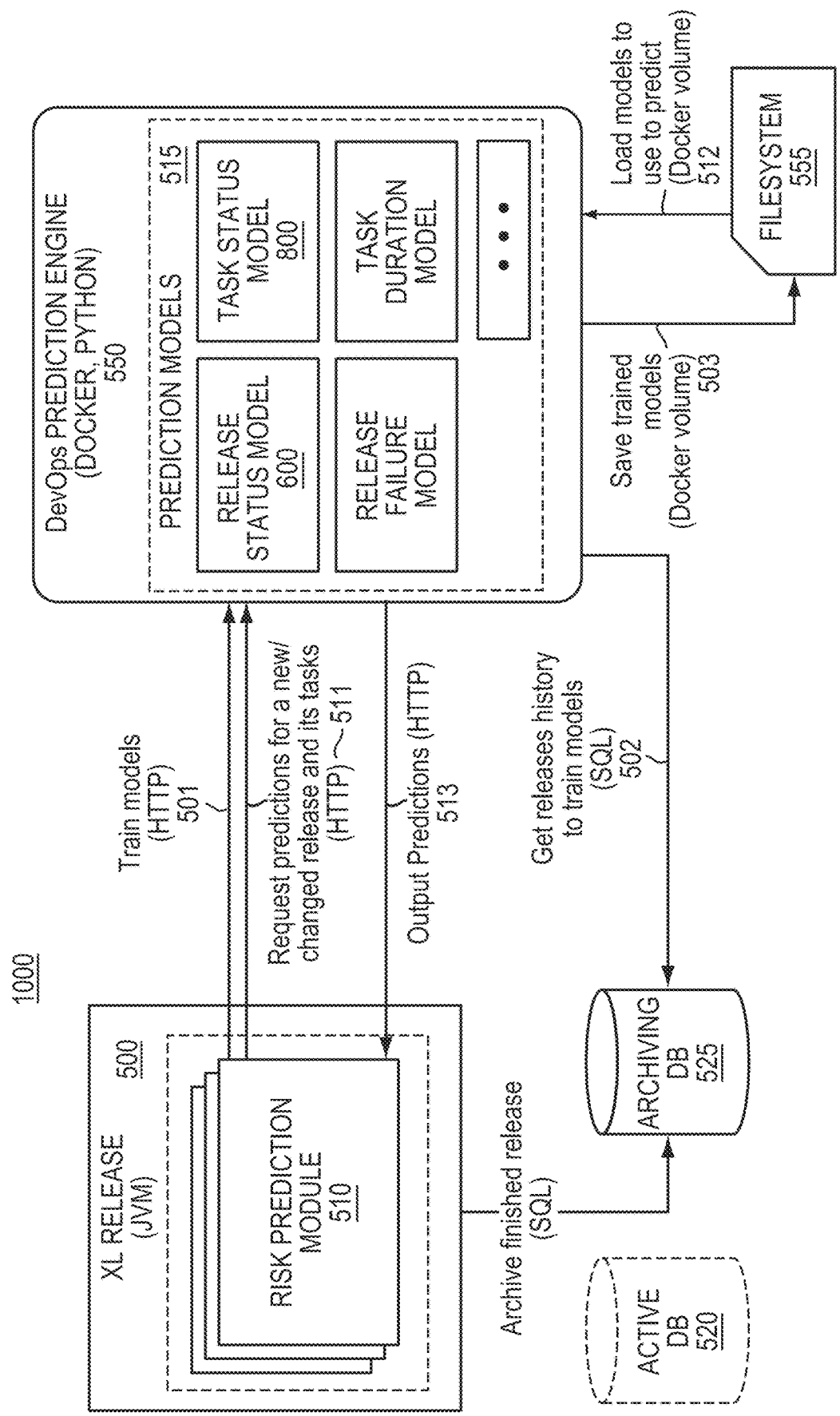
FIG. 5 is a schematic view of the entire architecture of the Risk Prediction module and DevOps Prediction Engine in embodiments. The schematic shows how the DevOps Prediction Engine of the present invention is connected to the release orchestration tool (such as in the improved version of XL Release®) and its archive database.

FIG. 5 is a schematic view of the architecture of the preferred embodiment 1000 of the present invention. It also describes the high-level operation of embodiments of the invention. In the illustrated embodiment, the system 1000 is packaged in two components: the DevOps Prediction Engine 550 and the Risk Prediction Module 510. The Risk Prediction Module 510 is a plug-in that enables additional functionality in XL Release®, i.e., the system's release orchestration tool, 500. Specifically, the Risk Prediction Module 510 plug-in enables prediction output visualization, such as on the Risk Forecast page (FIG. 9) where the predictions regarding a release/delivery pipeline and its individual steps are displayed. The DevOps Prediction Engine 550 contains the algorithmic prescriptions required to train the machine learning models 515 that provide the predictions. In the preferred embodiment, the DevOps Prediction Engine 550 is packaged in a Docker container, and therefore it is run by Docker, a virtualization software.

In addition to the forgoing, vital to the operation of embodiments are the Archiving Database 525, the Active Database 520, and the Filesystem 555. The Archiving Database 525 is a Database Management System (DBMS) where XL Release®/the release orchestration tool 500 stores release/delivery pipelines executed in the past. The Active Database 520 depicts a DBMS where XL Release®/the release orchestration tool 500 stores release/delivery pipelines that have not been started or have not yet finished, as well as other auxiliary data. The Filesystem 555 represents the data storage device of the server on which the DevOps Prediction Engine 550 runs, which is capable of persisting files in such a way that they are not lost when the Docker container or the server itself is restarted.

What follows is a description of how all these components are connected to one another, enabling the operation of embodiments of the present invention, as depicted on FIG. 5. The release orchestration tool/XL Release® 500 itself is an application that runs in a Java Virtual Machine (JVM), and typically it runs on a dedicated physical or virtual server. It communicates with both the Archiving Database 525 and Active Database 520 over the network using a Java Database Connectivity (JDBC) driver. The Archiving Database 525 communicates with the DevOps Prediction Engine 550 using the same JDBC driver. XL Release® 500 communicates directly with the DevOps Prediction Engine 550 over the network using the HTTP protocol. Typically, the DevOps Prediction Engine 550 will also run on a separate server, either physical or virtual.

In a different embodiment, the invention system 1000 could be packaged as a single component, without having a separate Docker container. The preferred embodiment packaging of FIG. 5 has some benefits that are particular to XL Release® as the chosen pipeline orchestration tool 500. One of the benefits is that the machinery needed to train the models 515 can run on a separate server, thus freeing up CPU and memory resources for normal operation of XL Release®/the release orchestration tool 500. Another benefit is that the DevOps Prediction Engine 550 algorithms can be implemented in the Python programming language, as opposed to XL Release® which runs in JVM and is implemented in Java-based languages.

There are two modes of operation of embodiments of the invention: a training mode and a predicting mode. Both are illustrated schematically in FIG. 5. In machine learning, training is the procedure of processing historical data by a machine learning algorithm and generating a "model" 515: a set of implicit rules that, when applied, produces a prediction of a property for a new entity that was not present in the historical data during the training phase. For release/delivery pipelines, training is done based on historical executions of release/delivery pipelines taken from the Archiving Database 525, and the models 515 are then stored on the Filesystem 555. When a prediction is needed for a new release/delivery pipeline, a previously generated set of models 515 is loaded from the Filesystem 555 and provides the prediction. The following is a step-by-step description of the steps in the training mode:

At step 501, XL Release®/the release orchestration tool 500 sends a request to the DevOps Prediction Engine 550 to start the training procedure. This action is triggered by a periodical scheduler inside XL Release® 500 with a configurable period. This period is two weeks by default in one embodiment but can be adjusted to be in accord with the rate at which release/delivery pipelines are created.

At step 502, the DevOps Prediction Engine 550 loads historical executions of release/delivery pipelines from the Archiving Database 525 and uses them to train the machine learning model (at 515). The algorithm used to train the models is described in detail later with reference to FIGS. 6-8. Each historical release/delivery pipeline is loaded from the Archiving Database 525 as a single JavaScript Object Notation (JSON) file. The DevOps Prediction Engine 550 uses the same set of releases to train two models at 515: one model 600 to predict qualities of a release/delivery pipeline, and another model 800 to predict qualities of individual steps composing a release/delivery pipeline.

At step 503, once the models 515 are ready, the DevOps Prediction Engine 550 saves them as files on the Filesystem 555. Each model 515 is saved in a binary format by the pickle Python library and represents a serialized form of an object in the Python programming language.

The release orchestration tool/XL Release® 500 is notified once the training is finished, and this information is also saved in its logging system. Typically, the training process can take between seconds and hours, depending on the complexity of the release/delivery pipelines, their number, the speed of the network between the Archiving Database 525 and the DevOps Prediction Engine 550, the speed of the Archiving Database 525, and so on.

XL Release®/the release orchestration tool 500 requests the predictions for a given subject release/delivery pipeline and its steps when a user opens the Risk Forecast page 900 (FIG. 9) in the user interface. At that point in time the following steps take place in response to a user interaction or command:

At step 511, XL Release®/the release orchestration tool 500 sends a request to the DevOps Prediction Engine 550 to start the prediction procedure. The request contains all available information about the current state of the subject release/delivery pipeline and its tasks in JSON format.

At step 512, the DevOps Prediction Engine 550 loads both models 515 from the Filesystem 555 and passes the requested release/delivery pipeline through them. During this process, relevant information is extracted in the form of features. Based on the extracted features, the models 515 generate or otherwise produce predictions. The specific details of all the inputs and outputs of the models 515 are described later in reference to FIGS. 6-11.

At step 513, the DevOps Prediction Engine 550 returns the outputs to XL Release®/the release orchestration tool 500, and then XL Release® renders the output predictions in the user interface so that a user can inspect the predictions in the web browser.

Figure 6:
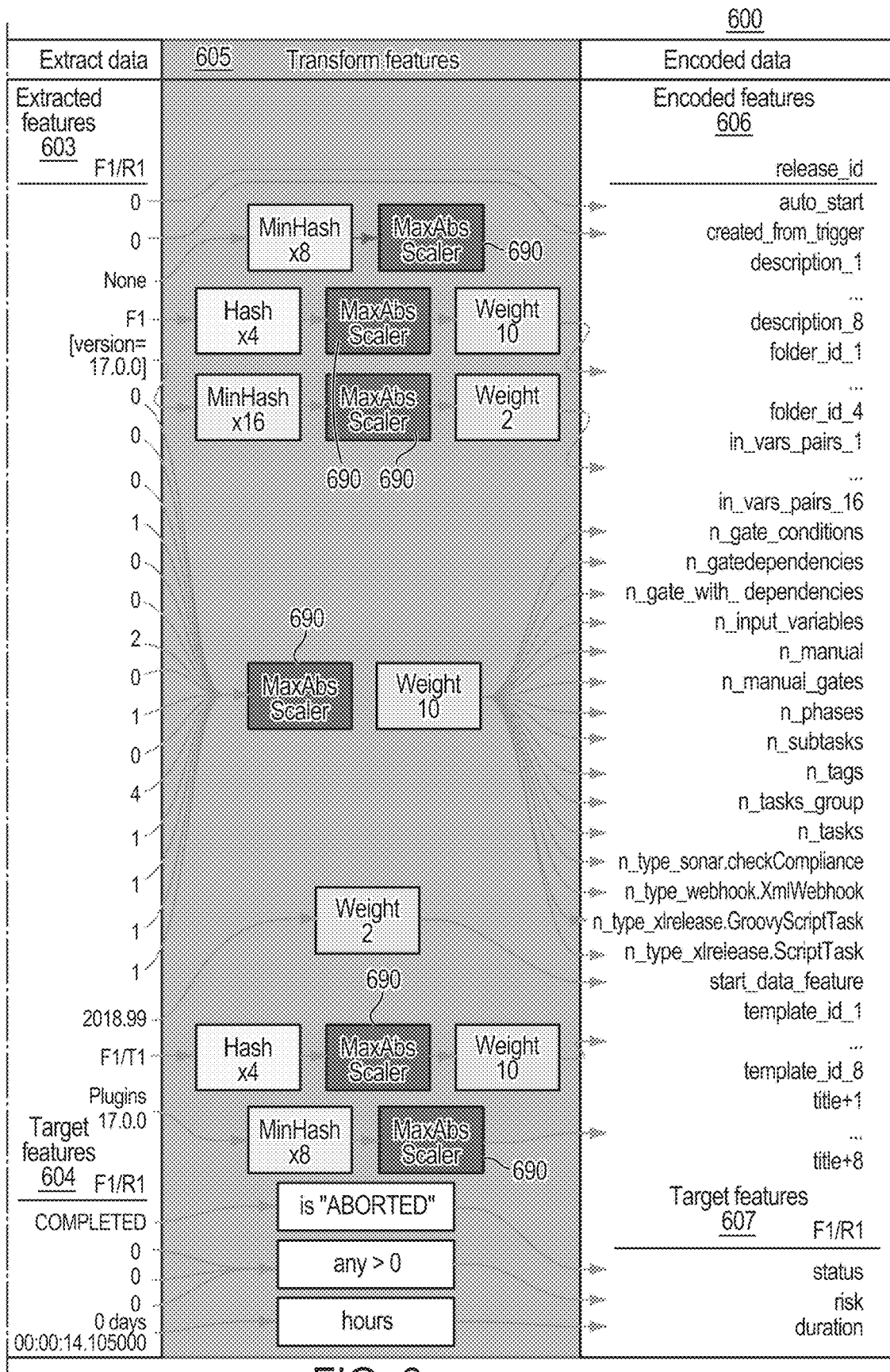
FIG. 6 is a comprehensive schematic of the entire machine learning process of one prediction model of the DevOps Prediction Engine of FIG. 5 responsible for predicting the expected status, risk, and duration of an application release/delivery pipeline.
Figure 6:
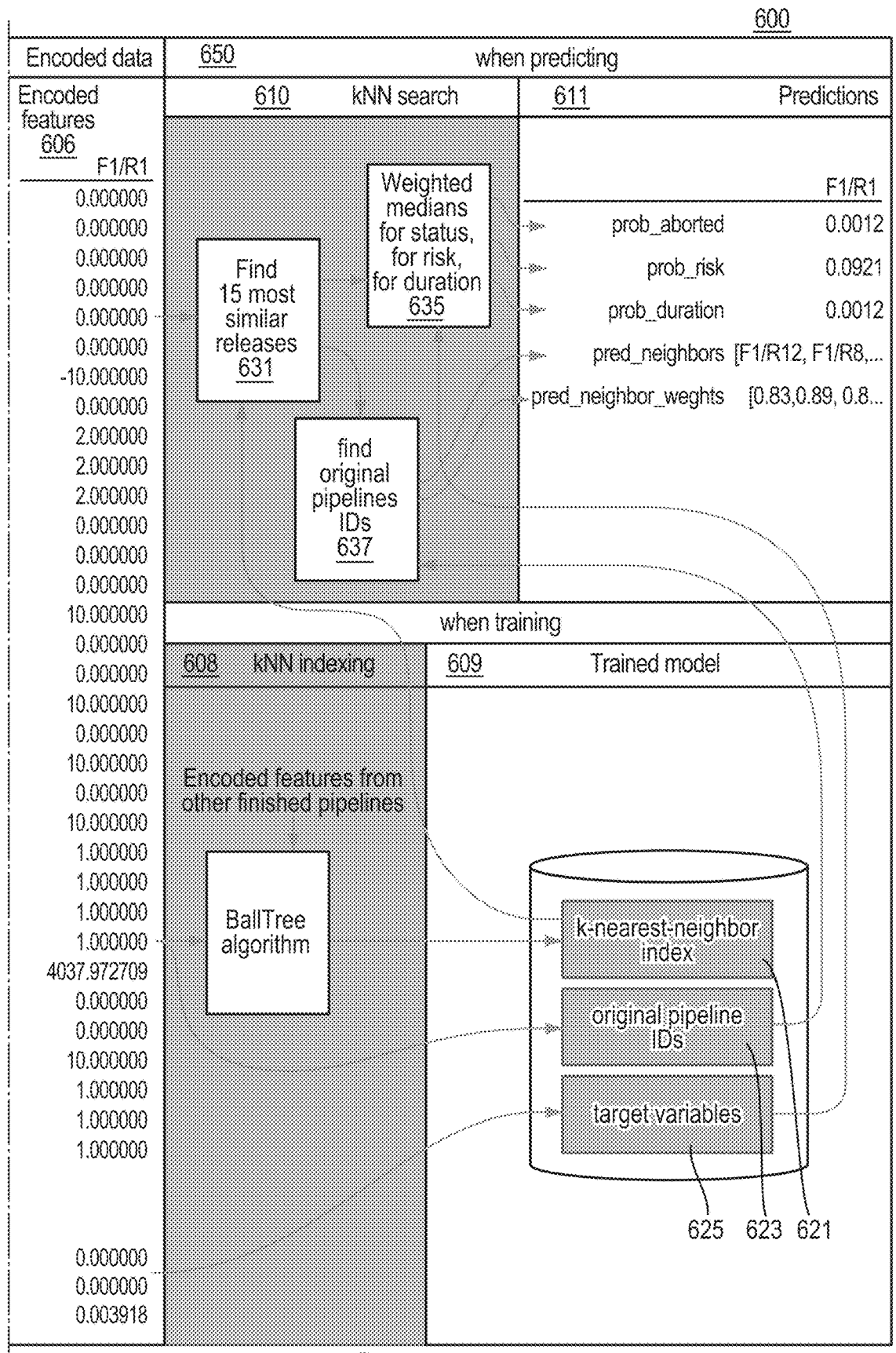

FIG. 6 is a detailed schematic of the machine learning procedure of model 600 housed in the DevOps Prediction Engine 550. The non-limiting example machine learning procedure provides the predictions related to the successfulness of the release/delivery process. The following is a description of said procedure. The process starts by querying data of the executed release/delivery pipelines from the Archiving Database 525. Each past pipeline execution, i.e. each training sample, is sent to the DevOps Prediction Engine 550 in JSON format. Only the most recent 25,000 release/delivery pipelines are queried. This ensures that the model 600 is trained only on the most recent and relevant data, without putting unneeded strain on computational resources. An example of a typical JSON file is shown in 601, i.e. the first block of FIG. 6.

From the JSON files 601, a number of relevant numerical and textual features are extracted at 602. The resulting extracted features 603 are:

"auto_start": which takes a value of 1 if a release pipeline is scheduled to start automatically, and 0 otherwise;
"created_from_trigger": which takes a value of 1 if the execution of a release pipeline was triggered by an external event, and 0 otherwise;
"start_date_feature": the date when a release pipeline was executed, converted to decimal years;
"title": the title of the release pipeline;
"description": a textual description of the release pipeline;
"folder_id": the identifier of the folder where the release pipeline is located;
"template_id": the identifier of the template on which a release pipeline is based;
"in_vars_pairs": a list of key-value pairs containing the user-defined variables that govern the release pipeline;
"n_gate_conditions": the number of gate conditions in the release pipeline;
"n_gate_dependencies": the number of gate dependences in the release pipeline;
"n_gate_with_dependencies": number of gates that contain dependences in the release pipeline;
"n_input_variables": the total number of user-defined input variables in the release pipeline;
"n_manual": the number of manual pipeline steps, or tasks in the context of XL Release®/tool 500;
"n_manual_gates": the number of manual tasks that contain conditions that must be fulfilled;
"n_phases": the number of phases in an XL Release®/tool 500 release pipeline;
"n_subtasks": the number of "subtasks" in an XL Release®/tool 500 release pipeline;
"n_tags": the number of tags added to a release pipeline;
"n_task_group": the number of task groups in a release pipeline;
"n_task": the total number of steps in a release pipeline, i.e. tasks in the context of XL Release®/tool 500; and
"n_type_taskname": the number of tasks of a particular type. Note that there can be an arbitrary number of such features, because there can be an arbitrarily large number of different task types in a DevOps release pipeline.

In addition, few features are extracted with which the target variables 625 are constructed. These are shown at target features 604:

"status": the final status of an executed release pipeline, which can be either "COMPLETED" or "ABORTED";
"failures_count": the total number of failures experienced amongst all tasks in a release pipeline;
"overdue_notified_tasks": the number of overdue tasks in a release pipeline;
"overdue_notified_release": takes the value of 1 if a release was overdue, and 0 otherwise; and
"duration": the duration of an executed release pipeline.

Following the extraction 602, the features 603, 604 are processed (i.e., transformed) 605 so that they are optimally suited for the predictive algorithm (also known as the predictor 650). The features that are Boolean in nature, i.e. contain only 1s and 0s, are simply passed on to the predictor. As seen in 603, there are only two such features in this case, which are "auto_start" and "created_from_trigger." The rest of the numerical features 603 are scaled with an MaxAbsScaler 690. This scales each numerical feature 603 individually, such that the maximum absolute value of each feature in the training set is set to 1. During training, only the maximum absolute value of each numerical feature 603 is determined. Then the features 603 are transformed such that each of their values is simply divided by the maximum absolute value of that feature.

The textual features 603 are first numerically encoded at transformation process 605 as vectors by a method called feature hashing, also popularly known as "the hashing trick" (Moody J., 1989, "Fast learning in multi-resolution hierarchies"; Weinberger L., et al., 2009, "Feature Hashing for Large Scale Multitask Learning"). This method takes a string as an input, and applies a hashing function to it resulting in a vector of a specified dimension. In general, any function that can be used to map data of arbitrary size onto data of fixed size can be called a hashing function. The outputs of such functions are often called hash values. In the preferred embodiment of the invention, two feature hashing strategies are implemented, depending on the meaning of the features 603 that are being encoded. The first strategy uses the FeatureHasher method as implemented in the scikit-learn library in Python (Pedregosa F., et al., 2011, "Scikit-learn: Machine Learning in Python"), which employs the signed 32-bit version of the Murmurhash3 hashing function. This approach to hashing attempts to uniformly distribute the resulting hash values in the vector space. The "folder_id" and "template_id" features 603 are vectorized using this strategy. Both features are randomly generated by XL Release®/the release orchestration tool 500, and thus any similarity between two of their samples is purely coincidental and holds no inherent meaning. On the other hand, the values of the features "title," "description," and "in_vars_pairs" are user-defined and do carry an inherent meaning. For instance, release/delivery pipelines that have similar titles, descriptions or input variables are likely to be similar to each other, and this should be reflected in how these features 603 are vectorized. This is achieved by the second hashing strategy that embodiments utilize, called MinHashing (Broder A. Z., et al., 1998, "Min-wise independent permutations"). MinHashing allows the estimation of the Jaccard similarity between two string samples of arbitrary length using small and fixed memory space. As a result, two similar strings that describe the titles of two release/delivery pipelines will have similar vectors after they are encoded with the MinHashing strategy. This ensures that similarity between release/delivery e pipelines that have similar "title," description," or "in_vars_pairs" is preserved when these features 603 are encoded as vectors at transform 605. Embodiments of the present invention employ the datasketch.MinHash library to do MinHashing, which uses the SHA1 hash function from Python's inbuilt hashlib library.

After transform 605 has encoded all the textual features 603 with either of the above two strategies or similar techniques, a MaxAbsScaler 690 is applied to all hash values. This step helps with the normalization of the features 603 and puts them roughly on the same scale. Other normalization techniques are also suitable.

Following the encoding and scaling of the features 603, some of them are weighted in the transformation process 605. This is done to give additional importance to the features which are most valuable to the end users. In one embodiment, the weighting is done by multiplying the numerical values of the features 603 by a constant. The larger the constant (i.e. the weight), the larger the importance of a given feature. As one can see at transform 605, in the example of FIG. 6, the largest importance is placed on the "template_id," "folder_id," as well as on the number of the various pipeline steps and their properties. After the transformation processing 605, the resulting encoded features 606 are ready to be passed to the predictor 650.

The machinery of model 600 responsible for the predictions of the successfulness of the release/delivery process simultaneously predicts three targets 607:
 status: whether an execution will result in a successful completion of the release pipeline, or the release will be aborted mid-way;
 risk: whether there is any risk associated with the execution of the release pipeline;
 duration: the duration of the release pipeline.

Thus, three separate sets of labels are required to train this machine learning model 600, one for each above-mentioned target quantity 607. These labels are also engineered from the archived release executions. To predict the final status of a release/delivery pipeline, the status field in the raw JSON files 604 is binary encoded at transform 605, with the value being 1 if the release/delivery pipeline was aborted, and 0 if it was completed. For the risk predictions, transform 605 sets the risk label to 1 if the release/delivery pipeline contains at least one task that either experienced at least one failure or was overdue, or if the execution of the release/delivery was overdue. For the duration of the pipeline, the duration field in the raw JSON data 604 is converted to decimal hours by transform 605. This field measures the duration of the entire execution of a release/delivery pipeline.

The preprocessed, encoded features 606 and the three sets of target labels 607 are then passed to the predictor 650. The predictor that is used in the preferred embodiment of the invention is the k-Nearest-Neighbors (kNN) algorithm. This is a non-parametric algorithm, as it makes no assumptions about the underlying data distribution, meaning the predictions are obtained directly from the data. The kNN algorithm is based on feature similarity: the results are derived from the past outcomes of the k samples that have the most similar features to a given test sample for which the predictions are being made.

The training 608 of the kNN algorithm is straightforward. The training data, i.e. the preprocessed features 606 as well as the three sets of target labels 607, are indexed by the kNN algorithm. The indexing is done with the balltree algorithm (Omohundro S. M., 1989, "Five Balltree Construction Algorithms") which enables an efficient search for the nearest neighbors of a test sample in the feature space provided. Once all the data have been indexed at 608, the algorithm (predictor 650) is ready to use the trained model 609 and provide predictions for a given test sample. The trained kNN model 609 consists of the indexed training data 621, where each release comprising the training data is tracked by its corresponding unique identifier 623, the target variables 625 (resulting from target labels 607) for each release, and the number (k) of nearest neighbors to be used to determine the predictions.

The predictions 611 provided by the implementation 610 of the kNN algorithm are obtained as follows. By default in one embodiment, the algorithm/predictor 650 at step 631 finds 15 nearest neighbors for each test sample, i.e. a sample for which predictions are required. Fast querying is done via the balltree algorithm, and a generalized Minkowski metric is used to calculate the distance between the test sample and the training data 621 indexed by the algorithm/predictor 650. The general Minkowski distance between two samples x1 and x2 can be mathematically described as:

$$d_{minkowski} = (\Sigma_{i=1}^{n} |x_{1,i} - x_{1,i}|^p)^{1/p} \quad \text{(Eq. 1)}$$

where $d_{minkowski}$ is the Minkowski distance, $x_{1,i}$ and $x_{2,i}$ are the $i^{th}$ component or feature of the $x_1$ and $x_2$ samples respectively, which comprise n features in total, while p can be any positive integer. When p is set to 1, the metric space is commonly called "Manhatten," while if p is 2 it is "Euclidean." The default value of p is 3 for this process.

Once the k nearest neighbors of a test sample are determined 631, the probability of a release/delivery pipeline execution being aborted or having non-zero risk associated with it is determined at step 635. Specifically, Step 635 calculates the normalized weighted sum of the past outcomes of those k neighbors. This can be mathematically described as:

$$p_{status} = \frac{\left(\sum_{i=1}^{k} w_i * y_{status,i}\right)}{k} \quad \text{(Eq. 2)}$$

$$p_{risk} = \frac{\left(\sum_{i=1}^{k} w_i * y_{risk,i}\right)}{k} \quad \text{(Eq. 3)}$$

In Eq. 2, $p_{status}$ is the probability of a release/delivery pipeline being aborted while it is being executed, k is the number of nearest neighbors (i.e. the most similar archived release/delivery pipeline, which is 15 by default), and $w_i$ is the weight of the $i^{th}$ neighbor, while $y_{status,i\_}$ is the label of that neighbor. Similarly, in Eq. 3 $p_{risk}$ the probability of a release/delivery pipeline having a non-zero risk, k is the number of nearest neighbors, and $w_i$ is the weight of the $i^{th}$ neighbor, while $y_{risk,i\_}$ is the label of that neighbor.

The predicted duration of a release/delivery pipeline is the weighted median of the durations of its k nearest neighbors. The weighted median label $y_{duration,wm}$ amongst the sorted $y_{duration,i}$ duration labels in which i goes from 1 to k, is the one that satisfies:

$$\Sigma_{i=1}^{k-1}(w_i) \leq 0.5 \& \Sigma_{i=k+1}^{n}(w_i) \leq 0.5 \quad \text{(Eq. 4)}$$

Step 637 determines the unique identifiers corresponding to the release/delivery pipelines were used for training the model 609.

In Eq. 2, Eq. 3, and Eq. 4, a weight $w_i$ of a neighboring sample is simply the inverse of its distance $d_i$ to the test sample, which can be mathematically described as:

$$w_i = 1/d_i \quad \text{(Eq.5)}$$

Note that for a release/delivery pipeline that has not been indexed at 608 by the kNN algorithm/predictor 650, the distance to any of its neighbors can never be zero, due to "start_date_feature."

One can now appreciate the choice of using the kNN algorithm as the predictor 650. Not only is the training phase 608 fast and straightforward, but only a single training, or in this case sole indexing phase, is required (necessitated) to provide predictions for each of the three targets 625 of interest. In addition, at this stage one can understand the feature preprocessing steps 605 better: the MinHashing is done to preserve any inherent similarity between features, while the scaling and weighting ensures that the most relevant features drive the predictions.

Figure 7:
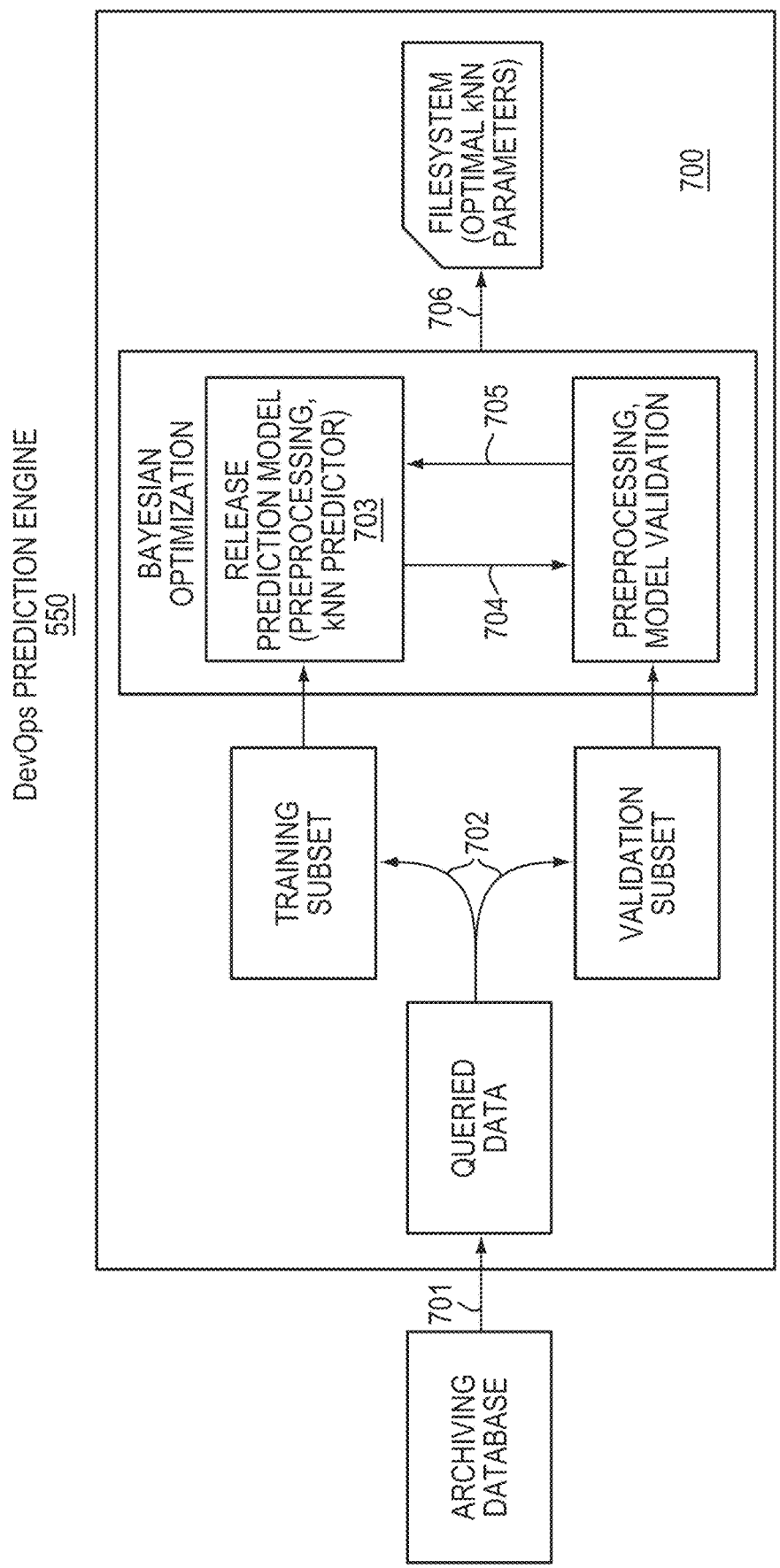
FIG. 7 is a block diagram illustrating the process of optimizing the relevant hyperparameter of the predictor in the machine learning model of embodiments that provides the predictions related to the entire release/delivery pipeline execution.

The performance of this model 609, in the sense of how correct the predictions are, depends heavily on the k parameter of the kNN predictor 650. To maximize its performance, an optimization step is performed before training 608 the model 515. In one embodiment of the invention, this is done every two weeks, to follow any changes in the structure of the data used for training. To find the optimal value of _k_ for a given dataset, a Bayesian Optimization is performed (Brochu E., Cora V. M., and de Freitas N., 2010, "A Tutorial on Bayesian Optimization of Expensive Cost Functions, with Application to Active User Modeling and Hierarchical Reinforcement Learning"; Snoek J., Larochelle H., Adams P. R., 2012, "Practical Bayesian Optimization of Machine Learning Algorithms"). A schematic of the optimization procedure (also referred to as Optimizer) 700 is shown in FIG. 7 and goes as follows.

The relevant data is queried 701 by the DevOps Prediction Engine 550. The data is then split 702 into a training subset and a validations subset. The validation subset comprises 13% of the total data that is queried. Then, the kNN predictor 650 is trained using the default value of k on the preprocessed training subset at Optimizer step 703. After the training of step 703 is complete, the performance of the predictor 650 is evaluated 704 using the preprocessed validation subset. The evaluation metric is the mean F1 score from the status and risk prediction targets 625 for release/delivery pipelines. The goal is to maximize the scoring metric. In tone embodiment, the optimization itself (step 705) is done with the BayesOpt library in Python. The BayesOpt library than provides a new value for k at 705, and the training process 703 is repeated. This is done 30 times, after which the optimization procedure 700 at step 706 stores the optimal value of k (i.e. the value that scores the highest) as part of the model 600 (or 515 generally) metadata on the Filesystem 555 of the Docker image. The stored optimal value of k is used until the model 600, 515 is re-optimized and a new preferred value for k is found. It should be noted that while this optimization process 700 does not explicitly attempt to optimize the number of nearest neighbors for the prediction of duration for release, the tests conducted by the inventors/Applicant show that such duration prediction target 625 benefits from Optimizer 700 as well.

Figure 8:
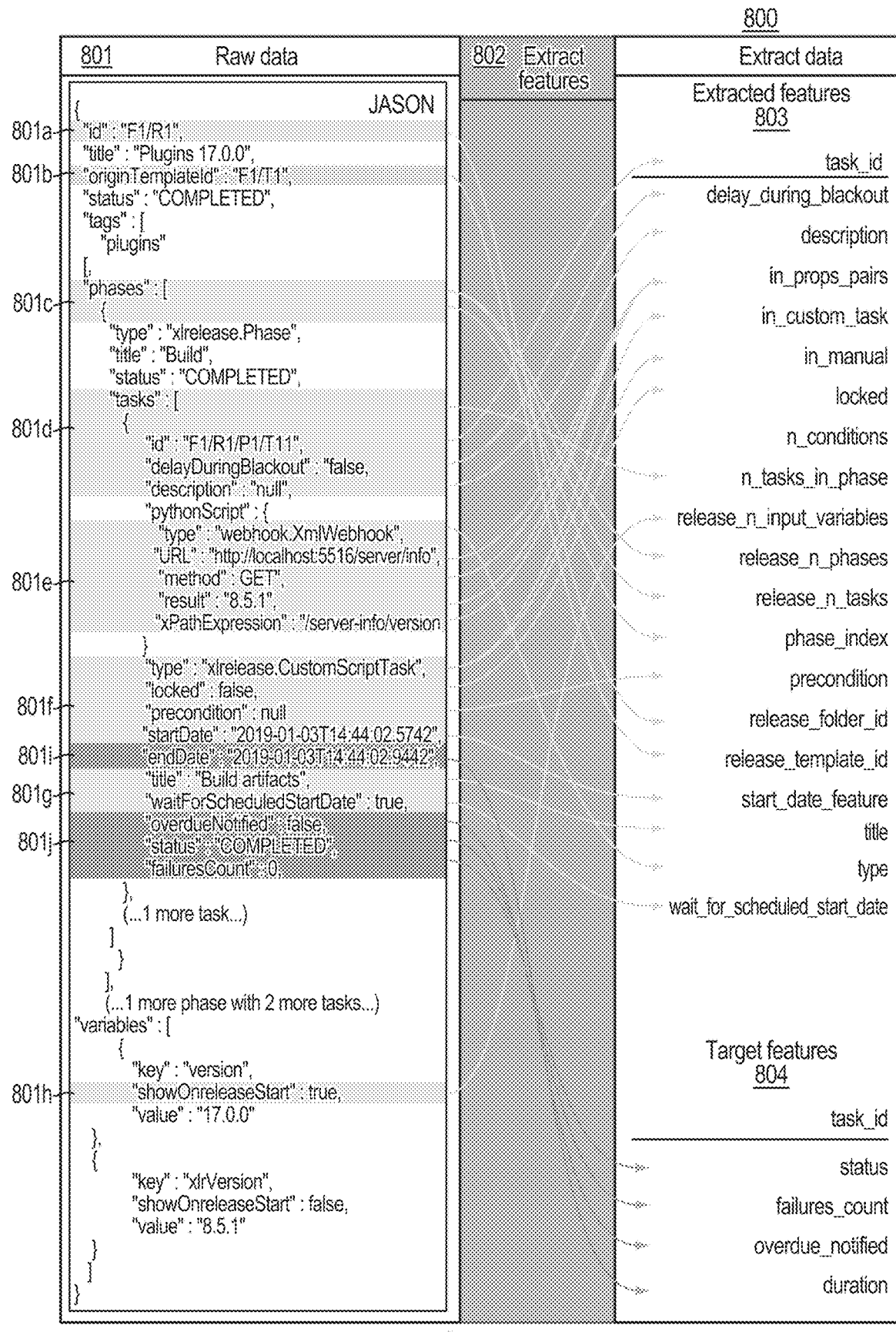
FIG. 8 is a comprehensive schematic of the entire machine learning process of the prediction model of the DevOps Prediction Engine of FIG. 5 responsible for predicting the expected status, probability of failure, and duration of each step of a given release/delivery pipeline.
Figure 8:
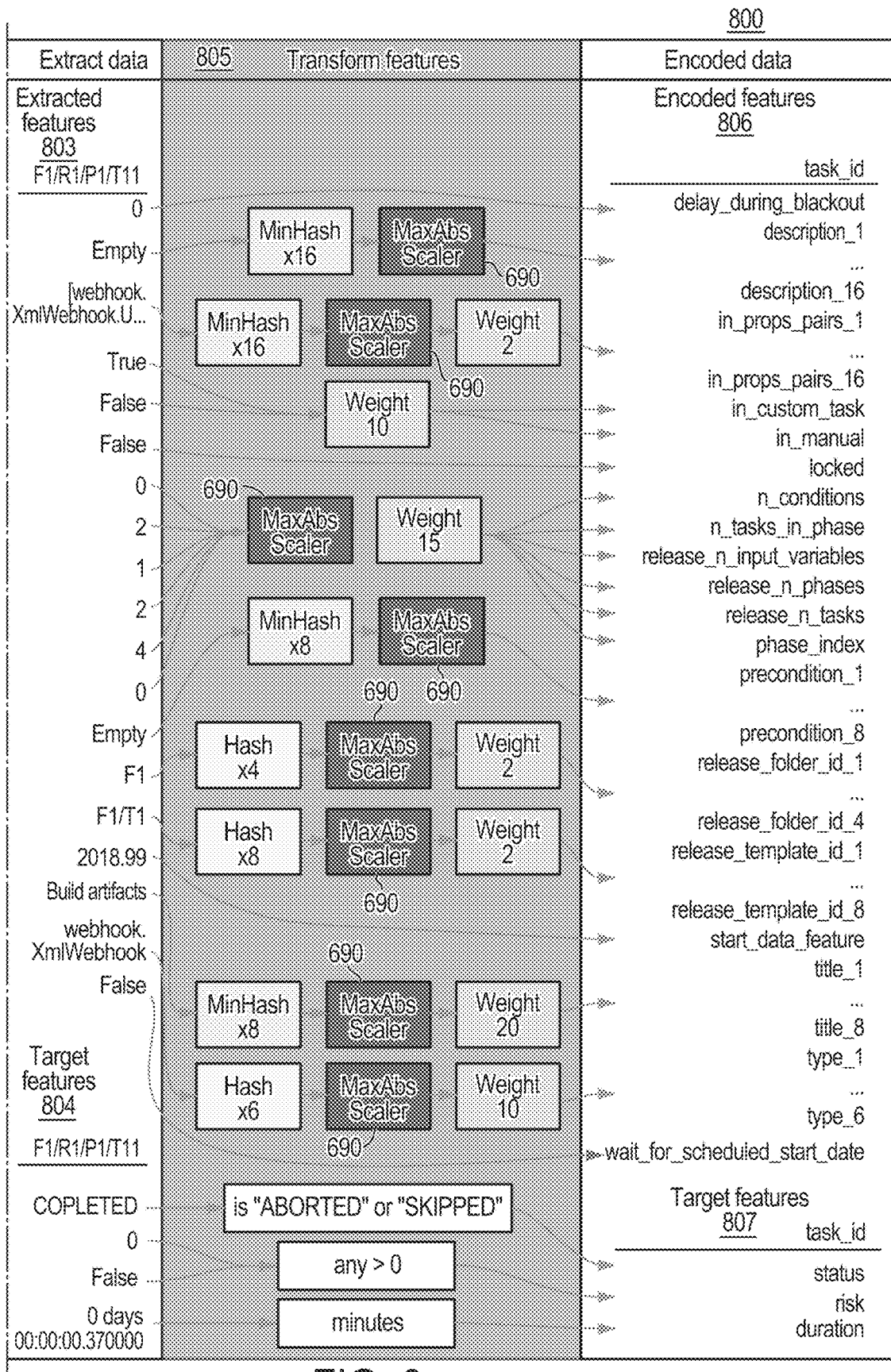
Figure 8:
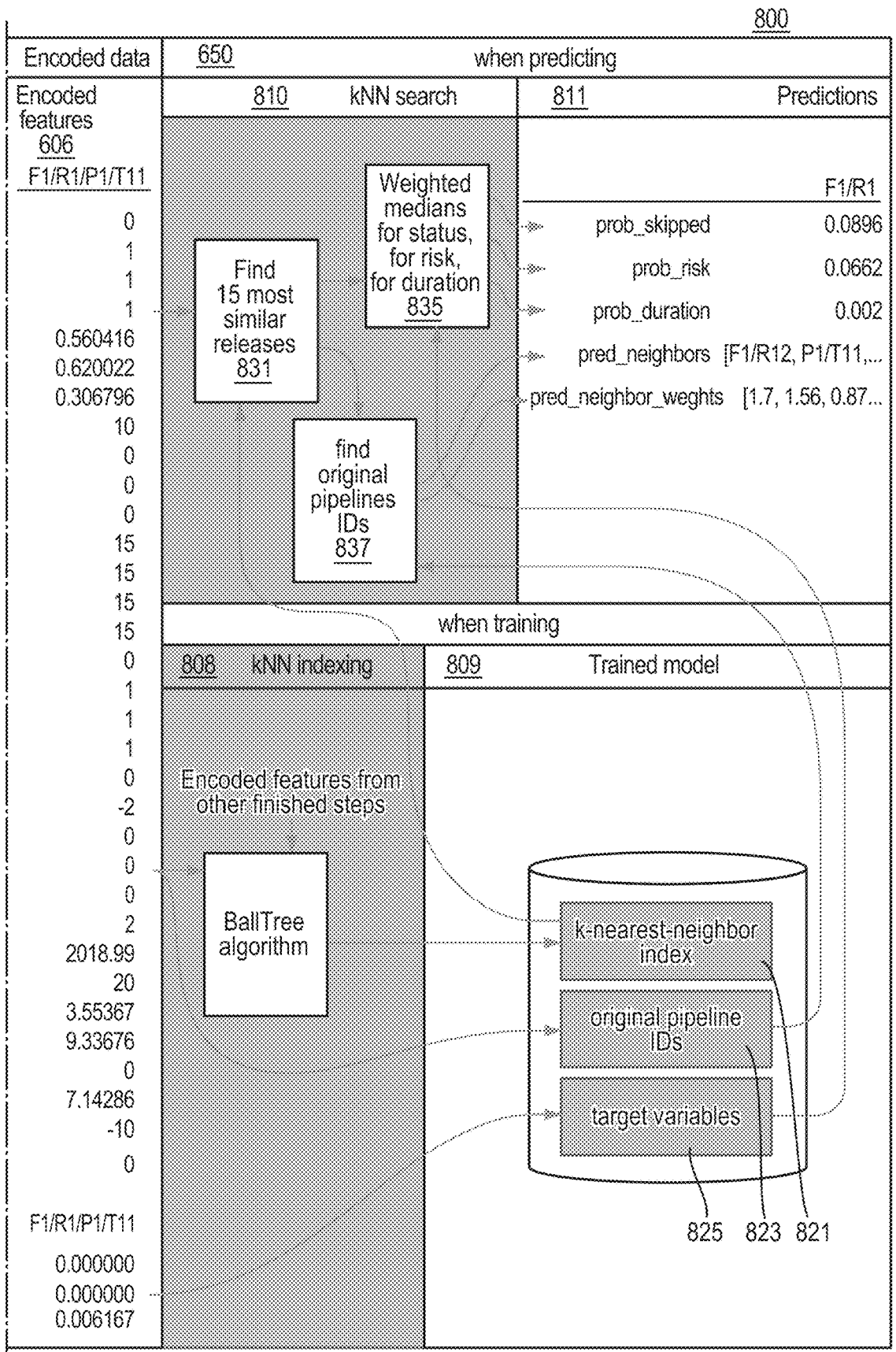

Another one of the prediction models 515 housed in the DevOps prediction engine 550 of FIG. 5 is the task status model 800. FIG. 8, depicts a detailed schematic of the machine learning procedure of model 800 in the DevOps Prediction Engine 550 of FIG. 5. By way of non-limiting example, model 800 provides predictions related to the execution of each pipeline step or task. In particular, this model 800 predicts whether a task will be skipped or aborted while the pipeline is being executed, whether a task will experience at least one failure while the pipeline is running, and the expected duration of the task. What follows is a description of this model 800. As in the case of the model 600 of FIG. 6, the machine learning procedure starts by querying 801 data of executed release/delivery pipelines from the Archiving Database 525. Each pipeline execution is sent to the DevOps Prediction Engine 550 in JSON format. Only data for a maximum of 10,000 tasks from the most recent release/delivery pipeline is queried and processed by this example model 800. This ensures that the model ingests only the most recent and relevant data, without requiring large computational power.

The first block 801 of FIG. 8. shows an example of a JSON file; the raw data fields 801a-h are shaded. The raw features that are extracted 802 for the purpose of training this model 800 in one embodiment include:
  "title": the title of the task;
  "description": the description of the task;
  "type": the type of the task;
  "is_manual": takes a value of 1 if the task is manual, and 0 if it is automatic;
  "is_custom_task": takes a value of 1 if the task is of a custom type, i.e. not one of the task types predefined in XL Release®/tool 500, and 0 otherwise;
  "in_props_pairs": a list of key-value pairs containing all of the custom user-defined properties that govern the task execution;
  "locked": takes a value of 1 if the task is locked (meaning that it cannot be edited, skipped, or moved within the pipeline), and 0 otherwise;
  "delay_during_blackout": takes a value of 1 if the task has a predefined period in which it should be inactive, and 0 otherwise;
  "n_conditions": the number of conditions that need to be satisfied for the task to be completed;
  "precondition": has a value of 1 if the task has preconditions, and it is 0 otherwise;
  "wait_for_schedule_start_date": has a value of 1 if the task has a scheduled start date on which it will automatically executed, and it is 0 otherwise;
  "start_date_feature": the date when the task was executed, converted to decimal years;
  "release_n_tasks": the total number of tasks in the parent release;
  "release_n_phases": the total number of phases in the parent release;
  "n_tasks_in_phase": the number of tasks in the phase in which the specific task is located;
  "phase_index": the order ordinal number of the phase in which the particular task is located;
  "release_n_input_variables": the total number of input variables in the parent release;
  "release_folder_id": the identifier of the folder where the parent release is located;
  "release_template_id": the identifier of the template on which the parent release is based.

The data fields 801i-j that are shaded in the first block 801 of FIG. 8. are used to construct the target variables 825 for the model 800 and include the following target features 804:
  "status": the final status of an executed task, can be "COMPLETED", "ABORTED," "SKIPPED," or "SKIPPED_IN_ADVANCE";
  "failures_count": the number of failures that a task experienced while it was being executed;
  "overdue_notified": has the value of 1 if a task was overdue, and is 0 otherwise;
  "duration": the duration of an executed pipeline task.

All of the raw extracted features 803, together with the features 804 used to engineer the target variables 825, are listed in the third block as extracted data in FIG. 8.

Once the raw features are extracted 802 from the JSON files 801, the features 803, 804 are preprocessed 805 in a similar fashion as the features of model 600. The preprocessor transformer 805 binary encodes the Boolean features, and weights some of them before sending the features 803 to the predictor 650. The numerical features 803 are first scaled with a MaxAbsScaler 690, and after which a weight is applied. The textual features 803 are first numerically encoded via the hashing trick, and then they are scaled with a MaxAbsScaler 690 and weighted appropriately at transform preprocessor 805. As in model 600, the textual features "template_id," "folder_id," and "type" hold no inherent contextual similarity between them, and are thus encoded with the FeatureHasher method from the scikit-learn Python library. Conversely, the textual features "title," "description," "precondition", and "in_props_pairs" have contextual similarity between them, and they are therefore encoded with the MinHashing method which preserves the similarity in the encodings. The weighting is done as described above, by multiplying the numerical values of each feature 803 by a constant. The larger the applied weight, the larger the importance placed on a given feature 803. From the preprocessor/transform 805 in FIG. 8, one can see that in the preferred embodiment of the invention, the largest importance in this model 800 is placed on the "title" feature, followed by the features 803 that describe the structure of the release a task is part of, such as "n_conditions," "release_n_phases," "release_n_tasks," and so on. The resulting encoded features 806 are passed to predictor 650.

The machine learning model 800 that is centered on the tasks of release/delivery pipelines simultaneously predicts three target quantities 807:
  status: whether a task will be successfully completed;
  risk: whether a task will experience at least one failure or be delayed while it is being executed; and
  duration: the duration of a particular task.
Therefore, three sets of labels are needed to train this machine learning model 800, one for each target quantity. The labels are engineered (805) from extracted data 804, i.e., the raw data that was extracted from the training dataset. To predict the final status of a task, the "status" field from the raw JSON file is encoded at transform 805 to be 1 if the task has not been successfully executed, i.e. if the "status" field contains the "ABORTED," "SKIPPED," or "SKIPPED_IN_ADVANCE" keywords. If the "status" field contains the "COMPLETED" keyword, the transform 805 encoding value is 0. To predict the risk of a task, transform 805 sets the appropriate label to 1 if either the "failures_count" or the "overdue_notified" field of the portions of the JSON file that describe that particular task is non-zero, and sets it to 0 otherwise. Finally, to determine the likely duration of a task, the "duration" field of the JSON file that is part of the task description is converted to minutes by transform 805.

The three sets of labels 807, together with all of the preprocessed features 806, are passed to the predictor 650, which is the kNN algorithm. The training 808 of the predictor 650 is identical to that of the model 600 in FIG. 6: the preprocessed features 806 and the labels 807 are indexed using the balltree algorithm. The trained model 809 contains the indexed training data 821, where each task is tracked by its own unique identifier 823, the target variables 825 (resulting from target labels 807) for each task, and the number (k) of nearest neighbors to be used during at inference. The predictions 811 provided by the kNN predictor (step 810) are obtained in a similar fashion as for the model 600 in FIG. 6. By default, the algorithm/predictor 650 at step 831 finds the 15 nearest neighbors to a given test sample, i.e. a task for which the predictions are required. The metric used to calculate the distances between the test sample and the indexed tasks is the Manhattan distance, which is a form of the generalized Minkowski distance when the p variable in Eq. 1. is set to 1.

The probability that a release/delivery pipeline step (i.e. a task) will not be completed successfully is calculated at step 835. In particular, step 835 calculates the normalized distance-weighted sum of the number of tasks that were not successfully completed from amongst those k nearest neighbors. This can be mathematically described as:

$$p_{status\_task} = \frac{\left(\sum_{i=1}^{k} w_i * y_{status,i}\right)}{k} \quad \text{(Eq. 6)}$$

Where $prob_{status\_task}$ is the probability of a task to not be completed successfully, k is the number of nearest neighbors (i.e. the number of most similar tasks, which is 15 by default), and $w_i$ is the weight of the $i^{th}$ neighbor, while $y_{status,i}$ is the label of that neighbor.

The probability of a risky task is determined much in the same way as the probability of a task not being completed successfully, however, some of the k closest neighboring tasks are not included in the calculation. The tasks that have a "ABORTED," "SKIPPED," or "SKIPPED_IN_ADVANCE" value in their "status" field, and that have not experienced any failures or delays are excluded from the calculation. Such tasks have not been executed by the release/delivery pipeline, so for them, it is not known whether they would have experienced failures or delays. The modified mathematical expression that describes this nuance is:

$$p_{risk\_task} = \frac{\left(\sum_{i=1}^{\tilde{k}} w_i * y_{risk,i}\right)}{\tilde{k}} \quad \text{(Eq. 7)}$$

Where the $p_{task\_risk}$ is the probability of a task to be at risk of experiencing a failure or a delay, and $\tilde{k}$ is the number of nearest neighbors that have the necessary predictive power according to the above stated requirements, among the k number of closest neighbors that the predictor selects. Note that $\tilde{k} \leq k$. Finally, $w_i$ is the weight of the $i^{th}$ neighbor, while $y_{risk,i}$ is the label of that neighbor.

The predicted task duration is calculated in the same way as described in Eq. 4. However, only the tasks that have a "COMPLETED" value in their "status" fields amongst the k closest neighbors contribute to the prediction. Step 837 determines original step unique identifiers corresponding to the labels.

Returning to FIG. 5, step 511, to obtain a prediction, XL Release®/tool 500 sends a release/delivery pipeline that is stored in the Active Database 520 to the DevOps Prediction Engine 550 via the Risk Prediction Module plug-in 510 in JSON format. The JSON file is passed on to the two machine learning models 600 and 800 within the DevOps Prediction Engine 550. The models 600, 800 then proceed according to schematics shown in FIG. 6 and FIG. 8; the relevant features for each model are extracted and preprocessed in the same manner as the corresponding training data, after which they are passed to the kNN predictive algorithms 650. The kNN predictor 650 of release status model 600 returns the probability of the release being aborted and the probability of it having a non-zero risk factor, as well as the estimated duration of that release/delivery pipeline (collectively predictions 611). At the same time, the kNN algorithm/predictor 650 provides the probability of a task being aborted or skipped, the probability of a task experiencing failures or delays, and the estimated duration of a task, for each task in the parent release pipeline (collectively predictions 811). In addition, the kNN predictors 650 at 637 and 837 also provide the unique identifiers for the k most similar past releases and tasks that were used to determine the predictions 611, 811. The DevOps Prediction Engine 550 at step 513 returns the set of predictions 611, 811 to the Risk Prediction Module plug-in 510, which are then displayed on the Risk Forecast page 900 in XL Release®/tool 500.

Provided the Risk Prediction Module 510 is active, a user such as the release manager of an organization can view the results from the DevOps Prediction Engine 550 in XL Release®/tool 500, on the dedicated Risk Forecast page 900. This page can be accessed via the "Release flow" view, by selecting (clicking) the "Release flow" button and selecting "Risk forecast". The Risk Forecast page 900, an example of which is shown on FIG. 9, presents an overview of the structure of a release, and it presents the predictions in the form of warnings whenever the probability of a failure, risk, or a delay is likely to occur to the release and any of its constituent tasks.

The user can select (click) the "Predicted Risk" field 910 for the subject release, after which a release statistics window 1000 containing a detailed view describing how the specific predictions were determined appears. The window 1000 shows the statistics that lead to the predictions: the number of most similar release/delivery pipelines that were aborted or were risky out of the k most similar releases found by the kNN algorithm. In addition, the window 1000 displays the k most similar releases, so that a user can easily see the title and outcome of each one of them. Each of the similar releases is a field that can be selected (clicked), upon which the user is taken to the "Release flow" page in XL Release®/tool 500, where one can see the structure and details of that release/delivery pipeline. An example of such a release statistics window 1000 is shown on FIG. 10.

Selecting (clicking) the "Prediction Risk" field 910 of a specific task on the Risk Forecast pages 900 opens a task statistics window 1100 in which details regarding the predictions of that task are displayed. An example of such a window 1100 is shown in FIG. 11. At the top, the window 1100 displays the median duration, the median number of failures, and the total number of failures amongst the k most similar tasks the kNN algorithm queried. The window 1100 also shows how many of the k most similar tasks were completed, skipped, and aborted. Similarly to FIG. 10, the task status window 1100 displays the title, the type, and the outcome of each task. In addition, there is a column field titled "Relevance" 1101 which indicates how similar a queried task is in relation to the task the predictions are obtained for. Each displayed task can be selected (clicked on), after which the user is taken to the "Task view" page in XL Release®/tool 500, where one can examine the full details of that particular task.

Figure 10:
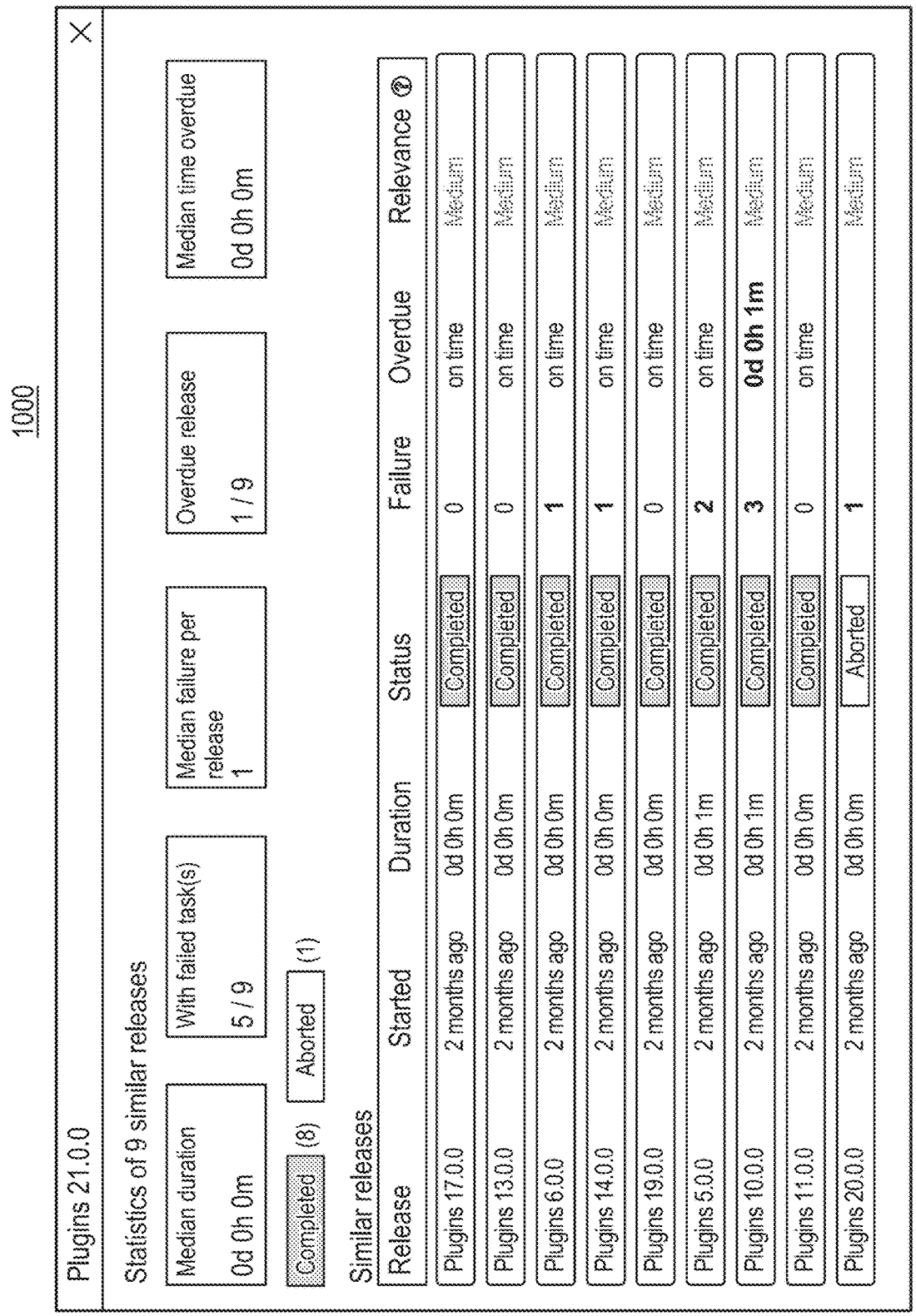
FIG. 10 is a detailed view of the predictions provided by the present invention, related to an upcoming pipeline execution, as displayed in the UI of embodiments. This screen view is shown when one clicks the prediction result for a release on the Forecast page in embodiments as shown in FIG. 9.

Considering FIG. 10 and FIG. 11, one can appreciate the power of the Risk Forecast page 900 or a similar page. The statistics windows 1000, 1100 described by these two figures display the predictions in a clear and informative way and offer interpretability. By viewing the k most similar releases or tasks and their outcomes from the Archiving Database 525, a user can easily get a sense of common patterns among the various sets of release/delivery pipelines, and the type of pipeline steps that, for example, are often skipped or are prone to failures. Such insights are extremely valuable to an organization, as they help the organization improve its software release/delivery strategy, as well as its overall DevOps processes.

While this invention has been particularly shown and described with references to an example embodiment thereof, it will be understood by those skilled in the art that various changes in form and details may be made therein without departing from the scope of the invention encompassed by the appended claims.

The teachings of all patents, published applications, and references cited herein are incorporated by reference in their entirety.

What is claimed is:

1. A computer implemented method of orchestrating software releases, the computer implemented method comprising:
    obtaining metadata from a subject DevOps release/delivery pipeline through a DevOps tool interface;
    using the obtained metadata as input to train one or more machine learning prediction models in a manner resulting in model generated predictions of any combination of:
        a risk associated with an execution of the subject DevOps release/delivery pipeline;
        a probability that the execution of the subject DevOps release/delivery pipeline will fail to finish successfully; and
        a likely duration of the execution of the subject DevOps release/delivery pipeline; and
    outputting the model generated predictions in a user interface,
    wherein the steps of obtaining, using, and outputting are automatically implemented by a processor in response to user commands,
    wherein a first machine learning prediction model predicts the risk associated with the execution of the subject DevOps release/delivery pipeline, the probability that the execution of the subject DevOps release/delivery pipeline failing to finish successfully, and the likely duration of the execution of the subject DevOps release/delivery pipeline,
    wherein the first machine learning prediction model considers any combination of skipped, failed, retried, and delayed steps or tasks in predicting the risk associated with the execution of the subject DevOps release/delivery pipeline,
    wherein the one or more machine learning prediction models assign different weights to different data types of the obtained metadata used as input, wherein the different weights are determined based on an importance of each data type of the different data types,
    wherein the one or more machine learning prediction models employ a k-nearest neighbor algorithm with a weighted median statistic to determine the model generated predictions, and
    wherein the DevOps tool interface comprises a plug-in to a release orchestration tool.

2. The computer implemented method of claim 1, wherein a second machine learning prediction model, different from the first machine learning prediction model, predicts:

a status of each step in the subject DevOps release/delivery pipeline;
a probability of failure for each step in the subject DevOps release/delivery pipeline; and
a likely duration of each step in the subject DevOps release/delivery pipeline.

3. The computer implemented method of claim 2, wherein the second machine learning prediction model predicting the status of each step in the subject DevOps release/delivery pipeline includes predicting a probability of each step in the subject DevOps release/delivery pipeline as being completed, aborted, or skipped.

4. The computer implemented method of claim 2, wherein the obtained metadata used as input includes any combination of:
a task type;
a description of a task;
a flag marking whether a task is manual or automatic;
a flag marking whether a task is custom made by a user;
a flag marking whether a task is locked or not;
a flag marking whether a task has preconditions;
a flag marking whether a task is set to be delayed during a blackout;
a flag marking whether a task has to wait for a scheduled starting date;
a number of conditions in a task;
a number of tasks in a phase in which a task resides;
a number of input variables in the subject DevOps release/delivery pipeline;
a number of phases in the subject DevOps release/delivery pipeline;
a number of tasks in the subject DevOps release/delivery pipeline;
an identifier of a pipeline template of which a task is part of; and
an identifier of a folder in which the pipeline template resides that a task is part of.

5. The computer implemented method of claim 1, wherein the obtained metadata used as input includes any two or more of:
titles of tasks composing the subject DevOps release/delivery pipeline;
a description of the tasks composing the subject DevOps release/delivery pipeline;
a number of tasks composing the subject DevOps release/delivery pipeline;
a number of phases composing the subject DevOps release/delivery pipeline;
a number of each task type composing the subject DevOps release/delivery pipeline;
a number of manual tasks;
a number of tags;
a number of sub tasks;
a number of gate tasks;
a number of gate conditions;
a number of gate dependencies;
a number of input variables associated with the subject DevOps release/delivery pipeline;
input variables associated with the subject DevOps release/delivery pipeline;
an identifier of a template from which the subject DevOps release/delivery pipeline has been created;
an identifier of a folder in which the subject DevOps release/delivery pipeline resides;
a date when the execution of the subject DevOps release/delivery pipeline started;
a flag marking whether the subject DevOps release/delivery pipeline was executed automatically or manually; and
a flag marking whether the subject DevOps release/delivery pipeline has been created from an external trigger.

6. The computer implemented method of claim 1, wherein the one or more machine learning prediction models encode non-numerical data types of the obtained metadata used as input, and wherein the encoding is performed by at least one of:
a MinHash algorithm;
a hashing algorithm; and
a frequency encoder.

7. The computer implemented method of claim 1, wherein the one or more machine learning prediction models generate predictions both prior to and while the subject DevOps release/delivery pipeline is being executed.

8. A computer implemented method of software release orchestration that releases/delivers software to a production environment or any other environment, the computer implemented method comprising:
obtaining metadata from a subject DevOps release/delivery pipeline through a DevOps tool interface;
using the obtained metadata as input to train one or more machine learning prediction models in a manner resulting in model generated predictions of any combination of:
a status of each step in the subject DevOps release/delivery pipeline;
a probability of failure for each step in the subject DevOps release/delivery pipeline; and
a likely duration of each step in the subject DevOps release/delivery pipeline; and
outputting the model generated predictions in a user interface,
wherein the steps of obtaining, using, and outputting are automatically implemented by a processor in response to user commands,
wherein a machine learning prediction model predicts the status of each step in the subject DevOps release/delivery pipeline, the probability of failure for each step in the subject DevOps release/delivery pipeline, and the likely duration of each step in the subject DevOps release/delivery pipeline,
wherein the one or more machine learning prediction models assign different weights to different data types of the obtained metadata used as input, wherein the different weights are determined based on an importance of each data type of the different data types,
wherein at least one of the one or more machine learning prediction models employs a k-nearest neighbor algorithm with a weighted median statistic to determine the model generated predictions, and
wherein the DevOps tool interface comprises a plug-in to a release orchestration tool.

9. The computer implemented method of claim 8, wherein the one or more machine learning prediction models predicting the status of each step in the subject DevOps release/delivery pipeline includes predicting a probability of each step in the subject DevOps release/delivery pipeline as being completed, aborted, or skipped.

10. The computer implemented method of claim 8, wherein the one or more machine learning prediction models generate predictions both prior to and while the subject DevOps release/delivery pipeline is being executed.

11. The computer implemented method of claim 8, wherein the obtained metadata used as input includes any combination of:
- a task type;
- a description of a task;
- a flag marking whether a task is manual or automatic;
- a flag marking whether a task is custom made by a user;
- a flag marking whether a task is locked or not;
- a flag marking whether a task has preconditions;
- a flag marking whether a task is set to be delayed during a blackout;
- a flag marking whether a task has to wait for a scheduled starting date;
- a number of conditions in a task;
- a number of tasks in a phase in which a task resides;
- a number of input variables in the subject DevOps release/delivery pipeline;
- a number of phases in the subject DevOps release/delivery pipeline;
- a number of tasks in the subject DevOps release/delivery pipeline;
- an identifier of a pipeline template of which a task is part of; and
- an identifier of a folder in which the pipeline template resides that a task is part of.

12. The computer implemented method of claim 11, wherein the one or more machine learning prediction models encode non-numerical data types of the obtained metadata used as input, and wherein the encoding is performed by at least one of:
- a MinHash algorithm;
- a hashing algorithm; and
- a frequency encoder.

13. A computer-based system applicable to any software release orchestrator, the computer-based system comprising:
- a processor to execute multiple machine learning prediction models;
- a user interface display operatively connected to the processor;
- a prediction engine executable by the processor and formed of the multiple machine learning prediction models; and
- a DevOps tool interface coupled to the prediction engine in a manner providing metadata from a subject DevOps release/delivery pipeline as input to train the multiple machine learning prediction models, and in response the multiple machine learning prediction models generating model generated predictions of any combination of: a risk associated with an execution of the subject DevOps release/delivery pipeline, and a status of each step in the subject DevOps release/delivery pipeline, wherein the status of each step in the subject DevOps release/delivery pipeline is any of completed, aborted, and skipped, and wherein the DevOps tool interface supports an output of the model generated predictions in the user interface display, wherein a first machine learning prediction model generates the model generated predictions of the risk associated with the execution of the subject DevOps release/delivery pipeline by considering any combination of: skipped, failed, retried, and delayed steps or tasks, wherein the first machine learning prediction model further predicts: a probability that the execution of the subject DevOps release/delivery pipeline will fail to finish successfully, and a likely duration of the execution of the subject DevOps release/delivery pipeline, wherein the multiple machine learning prediction models assign different weights to different data types of the provided metadata used as input, wherein the different weights are determined based on an importance of each data type of the different data types, wherein at least some of the multiple machine learning prediction models are formed by machine learning and employ a k-nearest neighbor algorithm with a weighted median statistic to determine the model generated predictions, and wherein the DevOps tool interface comprises a plug-in to a release orchestration tool.

14. The computer-based system of claim 13, wherein a second machine learning prediction model, different from the first machine learning prediction model, predicts a status of each step in the subject DevOps release/delivery pipeline, a probability of failure for each step in the subject DevOps release/delivery pipeline, and a likely duration of each step in the subject DevOps release/delivery pipeline.

15. The computer-based system of claim 13, wherein the multiple machine learning prediction models generate predictions both prior to and while the subject DevOps release/delivery pipeline is being executed.

* * * * *